(12) United States Patent
Wu

(10) Patent No.: US 11,902,325 B2
(45) Date of Patent: Feb. 13, 2024

(54) SESSION CONFIGURATION METHOD AND APPARATUS

(71) Applicant: HUAWEI TECHNOLOGIES CO., LTD., Guangdong (CN)

(72) Inventor: Rong Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 298 days.

(21) Appl. No.: 17/377,425

(22) Filed: Jul. 16, 2021

(65) Prior Publication Data

US 2021/0344716 A1 Nov. 4, 2021

Related U.S. Application Data

(63) Continuation of application No. PCT/CN2020/072868, filed on Jan. 17, 2020.

(30) Foreign Application Priority Data

Jan. 18, 2019 (CN) .......................... 201910051183.2

(51) Int. Cl.
*H04L 29/06* (2006.01)
*H04L 9/40* (2022.01)
*H04L 67/141* (2022.01)

(52) U.S. Cl.
CPC ........ *H04L 63/166* (2013.01); *H04L 63/0435* (2013.01); *H04L 63/20* (2013.01); *H04L 67/141* (2013.01)

(58) Field of Classification Search
CPC .... H04L 63/166; H04L 63/0435; H04L 63/20
See application file for complete search history.

(56) References Cited

U.S. PATENT DOCUMENTS

2011/0255693 A1* 10/2011 Escott .................. H04W 12/069
380/270
2018/0041930 A1* 2/2018 Hampel ................ H04W 76/11

FOREIGN PATENT DOCUMENTS

CN 104620536 A 5/2015
CN 105703890 A 6/2016
(Continued)

OTHER PUBLICATIONS

3GPP TR 33.825 V0.2.0: "3rd Generation Partnership Project; Technical Specification Group Services and System Aspects; Study on the Security for 5G URLLC (Release 16)", Nov. 2018, total 12 pages.

(Continued)

*Primary Examiner* — Jason K Gee

(57) ABSTRACT

A session configuration method and a session configuration apparatus are disclosed. According to the session configuration method, a terminal device sends, to a session management network element, a session establishment request used to request to establish a first session. After receiving the session establishment request, the session management network element sends redundant transmission security information to an access network device. After receiving the redundant transmission security information, the access network device sends the redundant transmission security information to the terminal device. The redundant transmission security information is used to indicate security keys and security policies of the first session and a second session that need to be established by the terminal device. The second session is a redundant session of the first session.

16 Claims, 9 Drawing Sheets

(56) References Cited

FOREIGN PATENT DOCUMENTS

| CN | 108347410 A | 7/2018 |
|---|---|---|
| WO | 2018167307 A1 | 9/2018 |

OTHER PUBLICATIONS

3GPP TSG-SA WG2 Meeting #128bis, S2-188904, Clarifications to solution #1 on dual connectivity based user plane redundancy, Ericsson, Sophia Antipolis, France Aug. 20-24, 2018, total 10 pages.
3GPP TR 23.725 V0.2.0, 3rd Generation Partnership Project; Technical Specification Group Services and System Aspects;Study on enhancement of URLLC supporting in 5GC (Release 16) Jun. 2018, total 28 pages.
Ericsson: "Security solution for handling UP security policy for multiple PDU sessions used for redundant data transmission", 3GPP Draft; S3-183822, Nov. 16, 2018, XP051565056, total 2 pages.
SA WG2 Meeting #129bis, S2-1811944, Analysis of URLLC solutions using DC, Qualcomm Incorporated, West Palm Beach, FL, USA, Nov. 26-30, 2018, total 18 pages.
3GPP TS 33.501, V15.3.1,"3rd Generation Partnership Project Technical Specification Group Services and System Aspects; Security architecture and procedures for 5G system (Release 15)", Dec. 31, 2018, pp. 1-181, XP051591577.
Office Action issued in CN201910051183.2, dated Dec. 21, 2020, 11 pages.
Notice of Allowance issued in CN201910051183.2, dated Jun. 30, 2021, 4 pages.
Extended European Search Report issued in EP20740939.2, dated Jan. 11, 2022, 8 pages.
International Search Report and Written Opinion issued in PCT/CN2020/072868, dated Apr. 8, 2020, 10 pages.

\* cited by examiner

SESSION CONFIGURATION METHOD AND APPARATUS

CROSS-REFERENCE TO RELATED APPLICATIONS

This application is a continuation of International Application No. PCT/CN2020/072868, filed on Jan. 17, 2020, which claims priority to Chinese Patent Application No. 201910051183.2, filed on Jan. 18, 2019. The disclosures of the aforementioned applications are hereby incorporated by reference in their entireties.

TECHNICAL FIELD

This application relates to the field of communications technologies, and in particular, to a session configuration method and an apparatus.

BACKGROUND

The 3rd generation partnership project (3GPP) defines three application scenarios in a fifth-generation (5G) mobile communications technology: enhanced mobile broadband (eMBB), massive machine type communication (mMTC), and ultra-reliable low-latency communication (uRLLC).

The uRLLC has both high reliability and a low latency, and has a wide variety of application scenarios. Currently, to ensure reliability of the uRLLC, an assumption is proposed: Transmission on one data channel is replicated to form another identical data channel for redundant transmission. When one of the data channels is unreliable for transmission or has a security problem, the other identical data channel can ensure normal data transmission. Herein, the data channel may be at a session granularity, a bearer granularity, or a quality of service flow (QoS flow) granularity.

This manner is only in an assumption stage, and how to configure two data channels still needs to be urgently addressed.

SUMMARY

Example embodiments of this application provides a session configuration method and an apparatus, to implement security configuration for two sessions used for redundant transmission.

According to a first aspect, an embodiment of this application provides a session configuration method. The method includes: First, an access network device receives redundant transmission security information of a first session from a session management network element. The redundant transmission security information is used to indicate security keys and security policies of the first session and a second session that need to be established by a terminal device. The second session is a redundant session of the first session. The access network device then sends the redundant transmission security information to the terminal device.

With the foregoing method, the access network device may send the redundant transmission security information to the terminal device, to ensure that the access network device and the terminal device have same security keys and same security policies for the two sessions (the first session and the second session) used for redundant transmission, and further ensure that security configuration is performed for the two sessions used for redundant transmission.

In an example embodiment, after receiving the redundant transmission security information of the first session from the session management network element, the access network device may configure the security keys and the security policies for the first session and the second session based on the redundant transmission security information.

With the foregoing method, the access network device can relatively conveniently perform security configuration for the first session and the second session on the access network device side, for example, configuration of the security keys and configuration of the security policies.

In an example embodiment, after receiving the redundant transmission security information of the first session from the session management network element, the access network device may send the security policies of the first session and the second session to the terminal device.

With the foregoing method, by sending the security policies of the first session and the second session to the terminal device, it can be ensured that security configuration can be performed for the first session and the second session on the terminal device side, for example, configuration of the security policies.

In an example embodiment, after receiving the redundant transmission security information of the first session from the session management network element, the access network device may further send a first parameter and a second parameter to the terminal device. The first parameter is a parameter used to generate a security key of the first session. The second parameter is a parameter used to generate a security key of the second session.

With the foregoing method, by sending the first parameter and the second parameter to the terminal device, it can be ensured that security configuration can be performed for the first session and the second session on the terminal device side, for example, configuration of the security keys.

In an example embodiment, the redundant transmission security information indicates that a security key and a security policy of the first session are the same as those of the second session, or indicates that a security key and a security policy of the first session are different from those of the second session.

With the foregoing method, the access network device can conveniently perform corresponding configuration on the security keys and the security policies of the first session and the second session by using the indication of the redundant transmission security information.

According to a second aspect, an embodiment of this application provides a session configuration method. The method includes: A terminal device sends a session establishment request to a session management network element. The session establishment request is used to request to establish the first session. Then the terminal device may receive the redundant transmission security information from an access network device. The redundant transmission security information is used to indicate security keys and security policies of the first session and a second session. The second session is a redundant session of the first session.

With the foregoing method, the terminal device receives the redundant transmission security information from the access network device, to ensure that the access network device and the terminal device have same security keys and same security policies for the two sessions (the first session and the second session) used for redundant transmission, and further ensure that security configuration is performed for the two sessions used for redundant transmission.

In an example embodiment, the terminal device may configure the security keys and the security policies for the first session and the second session based on the redundant transmission security information.

With the foregoing method, the terminal device can relatively conveniently perform security configuration for the first session and the second session on the terminal device side.

In an example embodiment, when configuring the security policies for the first session and the second session based on the redundant transmission security information, the terminal device may first receive the security policies of the first session and the second session from the access network device, and then configure the security policies for the first session and the second session based on the redundant transmission security information and based on the security policies of the first session and the second session.

With the foregoing method, the terminal device receives the security policies of the first session and the second session from the access network device, so that security configuration can be performed for the first session and the second session on the terminal device side, for example, configuration of the security policies.

In an example embodiment, when configuring the security keys for the first session and the second session based on the redundant transmission security information, the terminal device may first receive a first parameter and a second parameter from the access network device. The first parameter is a parameter used to generate a security key of the first session. The second parameter is a parameter used to generate a security key of the second session. Then the terminal device configures the security keys for the first session and the second session based on the redundant transmission security information and based on the first parameter and the second parameter.

With the foregoing method, the terminal device receives the first parameter and the second parameter from the access network device, so that security configuration can be performed for the first session and the second session on the terminal device side, for example, configuration of the security keys.

In an example embodiment, the redundant transmission security information indicates that the security key and a security policy of the first session are the same as those of the second session, or indicates that the security key and a security policy of the first session are different from those of the second session.

With the foregoing method, the terminal device can conveniently perform corresponding configuration on the security keys and the security policies of the first session and the second session by using the indication of the redundant transmission security information.

According to a third aspect, an embodiment of this application provides a session configuration method. The method includes: First, an access network device configures security keys and security policies for a first session and a second session that need to be established by a terminal device. The second session is a redundant session of the first session. Then the access network device sends an indication message to the terminal device. The indication message is used to indicate the security keys and the security policies of the first session and the second session.

With the foregoing method, the access network device may send the indication message to the terminal device, to ensure that the access network device and the terminal device have same security keys and same security policies for the two sessions (the first session and the second session) used for redundant transmission, and further ensure that security configuration is performed for the two sessions used for redundant transmission.

In an example embodiment, before configuring the security keys and the security policies for the first session and the second session that need to be established by the terminal device, the access network device may receive redundant transmission security information of the first session from a session management network element. The redundant transmission security information indicates that the security keys and the security policies of the first session and the second session are determined by the access network device. The redundant transmission security information indicates that a security key and a security policy of the first session are the same as or different from those of the second session.

With the foregoing method, after receiving the redundant transmission security information, the access network device may determine the security keys and the security policies of the first session and the second session based on the indication of the redundant transmission security information, or may determine the security keys and the security policies of the first session and the second session not based on receiving the indication of the redundant transmission security information, so that the security keys and the security policies of the first session and the second session can be configured more flexibly.

In an example embodiment, when configuring the security keys and the security policies for the first session and the second session that need to be established by the terminal device, the access network device may determine, according to a first rule, the security keys and the security policies configured for the first session and the second session. The first rule includes at least one of the following: load of the access network device, a network deployment policy, and a resource status of the access network device.

With the foregoing method, the access network device can flexibly configure the security keys and the security policies for the first session and the second session, so that an application scope can be extended.

In an example embodiment, the access network device may send the security policies of the first session and the second session to the terminal device.

With the foregoing method, the security policies of the first session and the second session are sent to the terminal device, so that security configuration can be conveniently performed for the first session and the second session on the terminal device side, for example, configuration of the security policies.

In an example embodiment, the access network device may further send a first parameter and a second parameter to the terminal device. The first parameter is a parameter used to generate a security key of the first session. The second parameter is a parameter used to generate a security key of the second session.

With the foregoing method, the first parameter and the second parameter are sent to the terminal device, so that security configuration can be conveniently performed for the first session and the second session on the terminal device side, for example, configuration of the security keys.

In an example embodiment, the access network device configures a same security key and a same security policy for the first session and the second session, and the indication message is used to indicate that the security key and a security policy of the first session are the same as those of the second session.

With the foregoing method, the terminal device can conveniently configure a same security key and a same security policy for the first session and the second session by using the indication of the first indication message.

In an example embodiment, the access network device configures different security keys and different security policies for the first session and the second session, and the indication message is used to indicate a the security key and a security policy of the first session are different from those of the second session.

With the foregoing method, the terminal device can conveniently configure different security keys and different security policies for the first session and the second session by using the indication of the first indication message.

According to a fourth aspect, an embodiment of this application provides a session configuration method. The method includes: First, a terminal device sends a session establishment request to a session management network element. The session establishment request is used to request to establish the first session. Then the terminal device may receive an indication message from an access network device. The indication message is used to indicate security keys and security policies of the first session and a second session. The second session is a redundant session of the first session.

With the foregoing method, the terminal device may receive the indication information from the access network device, to ensure that the access network device and the terminal device have same security keys and same security policies for the two sessions (the first session and the second session) used for redundant transmission, and further ensure that security configuration is performed for the two sessions used for redundant transmission.

In an example embodiment, the terminal device configures the security keys and the security policies for the first session and the second session based on the indication message.

With the foregoing method, the terminal device can relatively conveniently perform security configuration for the first session and the second session on the terminal device side.

In an example embodiment, when configuring the security policies for the first session and the second session based on the indication message, the terminal device may first receive the security policies of the first session and the second session from the access network device, and then configure the security keys and the security policies for the first session and the second session based on the indication message and based on the security policies of the first session and the second session.

With the foregoing method, the terminal device receives the security policies of the first session and the second session from the access network device, so that security configuration can be performed for the first session and the second session on the terminal device side, for example, configuration of the security policies.

In an example embodiment, when configuring the security keys for the first session and the second session based on the indication message, the terminal device may first receive a first parameter and a second parameter from the access network device. The first parameter is a parameter used to generate a security key of the first session. The second parameter is a parameter used to generate a security key of the second session. Then the terminal device configures the security keys for the first session and the second session based on the indication message and based on the first parameter and the second parameter.

With the foregoing method, the terminal device receives the first parameter and second parameter from the access network device, so that security configuration can be performed for the first session and the second session on the terminal device side, for example, configuration of the security keys.

In an example embodiment, the indication message indicates that the security key and a security policy of the first session are the same as those of the second session, or indicates that the security key and a security policy of the first session are different from those of the second session.

With the foregoing method, the terminal device can conveniently perform corresponding configuration on the security keys and the security policies of the first session and the second session by using the indication of the indication message.

According to a fifth aspect, an embodiment of this application provides a session configuration method. The method includes: After receiving a session establishment request from a terminal device, a session management network element may determine redundant transmission security information of a first session. The redundant transmission security information is used to indicate security keys and security policies of the first session and a second session. The session establishment request is used to request to establish the first session. The second session is a redundant session of the first session. Then the session management network element sends the redundant transmission security information to an access network device.

With the foregoing method, the session management network element sends the redundant transmission security information to the access network device, to ensure that the access network device and the terminal device have same security keys and same security policies for the two sessions (the first session and the second session) used for redundant transmission based on the indication of the redundant transmission security information, and further ensure that security configuration is performed for the two sessions used for redundant transmission.

In an example embodiment, when determining the redundant transmission security information of the first session, the session management network element determines the redundant transmission security information based on first information. The first information is some or all of the following:

subscription information of the terminal device, a session policy locally stored on the session management network element, and a session policy obtained by the session management network element from a policy control network element.

With the foregoing method, the access network device can flexibly determine the redundant transmission security information, so that an application scope can be extended.

In an example embodiment, the session management network element may alternatively determine the redundant transmission security information by using another network element. For example, the session management network element receives the redundant transmission security information from a policy control network element.

With the foregoing method, the access network device can flexibly determine the redundant transmission security information, so that an application scope can be extended.

In an example embodiment, when sending the redundant transmission security information to the access network device, the session management network element may send the redundant transmission security information to the access network device by using an access management network element.

With the foregoing method, the access network device can relatively conveniently transmit the redundant transmission security information.

In an example embodiment, the redundant transmission security information indicates that a security key and a security policy of the first session are the same as those of the second session, or indicates that a security key and a security policy of the first session are different from those of the second session, or indicates that the security keys and the security policies of the first session and the second session are determined by the access network device.

With the foregoing method, the access network device and the terminal device can conveniently configure different security keys and different security policies for the first session and the second session by using the indication of the redundant transmission security information.

According to a sixth aspect, an embodiment of this application further provides a communications apparatus. The communications apparatus is used in an access network device. For benefits, refer to the descriptions in the first aspect. Details are not repeated herein. The apparatus has a function of implementing the behavior in the method example in the first aspect. The function may be implemented by hardware, or may be implemented by hardware executing corresponding software. The hardware or software includes one or more modules corresponding to the function. In an example embodiment, a structure of the apparatus includes a receiver and a transmitter, and may further include a processor. These units may perform corresponding functions in the method example in the first aspect. For details, refer to the detailed descriptions in the method example. Details are not repeated herein.

According to a seventh aspect, an embodiment of this application further provides a communications apparatus. The communications apparatus is used in a terminal device. For benefits, refer to the descriptions in the second aspect. Details are not repeated herein. The apparatus has a function of implementing the behavior in the method example in the second aspect. The function may be implemented by hardware, or may be implemented by hardware executing corresponding software. The hardware or software includes one or more modules corresponding to the function. In an example embodiment, a structure of the apparatus includes a receiver and a transmitter, and may further include a processor. These units may perform corresponding functions in the method example in the second aspect. For details, refer to the detailed descriptions in the method example. Details are not repeated herein.

According to an eighth aspect, an embodiment of this application further provides a communications apparatus. The communications apparatus is used in an access network device. For benefits, refer to the descriptions in the third aspect. Details are not repeated herein. The apparatus has a function of implementing the behavior in the method example in the third aspect. The function may be implemented by hardware, or may be implemented by hardware executing corresponding software. The hardware or software includes one or more modules corresponding to the function. In an example embodiment, a structure of the apparatus includes a processor and a transmitter, and may further include a receiver. These units may perform corresponding functions in the method example in the third aspect. For details, refer to the detailed descriptions in the method example. Details are not repeated herein.

According to a ninth aspect, an embodiment of this application further provides a communications apparatus. The communications apparatus is used in a terminal device. For benefits, refer to the descriptions in the fourth aspect. Details are not repeated herein. The apparatus has a function of implementing the behavior in the method example in the fourth aspect. The function may be implemented by hardware, or may be implemented by hardware executing corresponding software. The hardware or software includes one or more modules corresponding to the function. In an example embodiment, a structure of the apparatus includes a receiver and a transmitter, and may further include a processor. These units may perform corresponding functions in the method example in the fourth aspect. For details, refer to the detailed descriptions in the method example. Details are not repeated herein.

According to a tenth aspect, an embodiment of this application further provides a communications apparatus. The communications apparatus is used in a session management network element. For benefits, refer to the descriptions in the fifth aspect. Details are not repeated herein. The apparatus has a function of implementing the behavior in the method example in the fifth aspect. The function may be implemented by hardware, or may be implemented by hardware executing corresponding software. The hardware or software includes one or more modules corresponding to the function. In an example embodiment, a structure of the apparatus includes a receiver, a transmitter, and a processor. These units may perform corresponding functions in the method example in the fifth aspect. For details, refer to the detailed descriptions in the method example. Details are not repeated herein.

According to an eleventh aspect, an embodiment of this application further provides a communications apparatus. The communications apparatus is used in an access network device. For benefits, refer to the descriptions in the first aspect. Details are not repeated herein. A structure of the communications apparatus includes a processor and a memory. The processor is configured to support the communications apparatus in performing a corresponding function in the method in the first aspect. The memory is coupled to the processor, and stores program instructions and data that are necessary for the terminal. The structure of the communications apparatus further includes a communications interface, configured to communicate with another device.

According to a twelfth aspect, an embodiment of this application further provides a communications apparatus. The communications apparatus is used in a terminal device. For benefits, refer to the descriptions in the second aspect. Details are not repeated herein. A structure of the communications apparatus includes a processor and a memory. The processor is configured to support the terminal in performing a corresponding function in the method in the second aspect. The memory is coupled to the processor, and stores program instructions and data that are necessary for the terminal. The structure of the communications apparatus further includes a transceiver, configured to communicate with another device.

According to a thirteenth aspect, an embodiment of this application further provides a communications apparatus. The communications apparatus is used in an access network device. For benefits, refer to the descriptions in the third aspect. Details are not repeated herein. A structure of the communications apparatus includes a processor and a memory. The processor is configured to support the terminal in performing a corresponding function in the method in the third aspect. The memory is coupled to the processor, and stores program instructions and data that are necessary for the terminal. The structure of the communications apparatus further includes a communications interface, configured to communicate with another device.

According to a fourteenth aspect, an embodiment of this application further provides a communications apparatus. The communications apparatus is used in a terminal device. For benefits, refer to the descriptions in the fourth aspect. Details are not repeated herein. A structure of the communications apparatus includes a processor and a memory. The processor is configured to support the terminal in performing a corresponding function in the method in the fourth aspect. The memory is coupled to the processor, and stores program instructions and data that are necessary for the terminal. The structure of the communications apparatus further includes a transceiver, configured to communicate with another device.

According to a fifteenth aspect, an embodiment of this application further provides a communications apparatus. The communications apparatus is used in a session management network element. For benefits, refer to the descriptions in the fifth aspect. Details are not repeated herein. A structure of the communications apparatus includes a processor and a memory. The processor is configured to support the terminal in performing a corresponding function in the method in the fifth aspect. The memory is coupled to the processor, and stores program instructions and data that are necessary for the terminal. The structure of the communications apparatus further includes a communications interface, configured to communicate with another device.

According to a sixteenth aspect, this application further provides a computer-readable storage medium. The computer-readable storage medium stores instructions. When the instructions are run on a computer, the computer is enabled to perform the methods in the foregoing aspects.

According to a seventeenth aspect, this application further provides a computer program product including instructions. When the computer program product is run on a computer, the computer is enabled to perform the methods in the foregoing aspects.

According to an eighteenth aspect, this application further provides a computer chip. The chip is connected to a memory, and the chip is configured to read and execute a software program stored in the memory, to perform the methods in the foregoing aspects.

DESCRIPTION OF EMBODIMENTS

Figure 1:
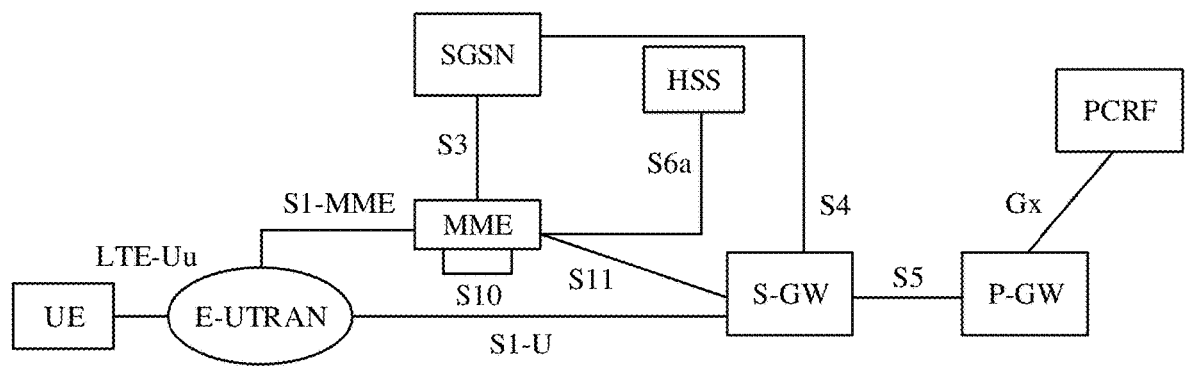
FIG. 1 is a schematic diagram of a network architecture according to an embodiment of this application.

To make the objectives, technical solutions and advantages of the embodiments of this application clearer, the following further describes the embodiments of this application in detail with reference to the accompanying drawings. A specific operation method in a method embodiment may also be used in an apparatus embodiment or a system embodiment. In the present disclosure, unless otherwise stated, "a plurality of" means two or more than two. In addition, it should be understood that, in the descriptions of the embodiments of this application, terms such as "first" and "second" are merely intended for a purpose of differentiated description, and should not be construed as an indication or an implication of relative importance, or an indication or an implication of a sequence.

For ease of understanding, concepts related to this application are described as examples for reference, as shown below.

(1) First session and second session: The embodiments of this application include two sessions used for redundant transmission: the first session and the second session. The first session and the second session are used to transmit same data, that is, used for redundant transmission. The first session and the second session are redundant sessions of each other. The first session and the second session may be PDU sessions or bearers (bearer).

(2) Security key: Security keys are keys used for data protection in a session, and include an encryption key, an integrity protection key, and the like.

The encryption key may be a parameter entered when a transmit end encrypts plaintext based on an encryption algorithm to generate ciphertext. If a symmetric encryption method is used, the encryption key and a decryption key are the same. A receive end may decrypt the ciphertext based on the same encryption algorithm and encryption key. In other words, the transmit end and the receive end may perform encryption and decryption based on a same key.

In certain embodiments, the encryption key may be referred to as $K_{UPenc}$ for short. The encryption key $K_{UPenc}$ may be generated based on an intermediate key by using a key generation algorithm such as KDF. This may be specifically shown in the following formula:

$K_{UPenc}$=KDF ($K_{gNB}$, another parameter), where the another parameter may be an encryption algorithm type, a length of an encryption algorithm type, an encryption algorithm identifier, a length of an encryption algorithm identifier, or the aforementioned parameters, and may further include some strings such as "uRLLC" and "Redundant Transmission Indication (RTI)", for example, $K_{UPenc}$=KDF ($K_{gNB}$, "uRLLC", the encryption algorithm type).

The integrity protection key may be a parameter entered when the transmit end performs integrity protection on the plaintext or the ciphertext based on an integrity protection algorithm. The receive end may perform, based on the same integrity protection algorithm and integrity protection key, integrity verification on data on which integrity protection is performed.

In the embodiments, the integrity protection key may be referred to as $K_{UPint}$ for short. The integrity protection key $K_{UPint}$ may be generated based on an intermediate key by using a key generation algorithm such as KDF. This may be specifically shown in the following formula:

$K_{UPint}$=KDF ($K_{gNB}$, another parameter), where the another parameter may be an integrity protection algorithm type, a length of an integrity protection algorithm type, an integrity protection algorithm identifier, a length of an integrity protection algorithm identifier, or the aforementioned parameters, and may further include some strings such as "uRLLC" and "Redundant Transmission Indication (RTI)", for example, $K_{UPint}$=KDF ($K_{gNB}$, "uRLLC", the integrity protection algorithm type).

(3) Intermediate key: a key required for generating an encryption key and an integrity protection key. In the embodiments of this application, intermediate keys may include $K_{AMF}$ and $K_{gNB}$. The $K_{gNB}$ may be classified into $K_{MgNB}$ and $K_{SgNB}$. The $K_{MgNB}$ is an intermediate key used by an MgNB to generate an encryption key and an integrity protection key. The $K_{SgNB}$ is an intermediate key used by a SgNB to generate an encryption key and an integrity protection key. The intermediate key may be further used to generate another key through derivation, for example, a key used in an uRLLC scenario. The key generated through derivation based on the intermediate key may be further used to generate, through derivation, encryption keys and integrity protection keys of mutually redundant sessions (corresponding to the first session and the second session in the embodiments of this application). For ease of description, $K_{uRLLC}$ is used to represent the key generated through derivation based on the intermediate key. A quantity of $K_{uRLLC}$ is not limited in the embodiments of this application.

The $K_{AMF}$ may be a key separately obtained by UE and an AMF network element in a registration and authentication process of the UE. In a dual-connectivity scenario, when both the MgNB and the SgNB have interfaces to the AMF network element, the $K_{MgNB}$ may be generated by the UE and the AMF network element based on the $K_{AMF}$. After generating the $K_{MgNB}$ based on the $K_{AMF}$, the AMF network element may send the $K_{MgNB}$ to the MgNB. The $K_{SgNB}$ is generated by the UE and the AMF network element based on the $K_{AMF}$. After generating the $K_{SgNB}$ based on the $K_{AMF}$, the AMF network element may send the $K_{SgNB}$ to the SgNB. When only the MgNB has an interface to the AMF, the $K_{SgNB}$ may be transferred by the MgNB to the SgNB. In another possible manner, the UE and the AMF network element generate only the $K_{MgNB}$. If the SgNB requires the $K_{SgNB}$, the MgNB may generate the $K_{SgNB}$ and send the $K_{SgNB}$ to the SgNB.

(4) Security policy: The security policy may be at least used to indicate whether to activate encryption protection and/or integrity protection. In an implementation, the security policy may indicate a preference for security protection, for example, may indicate that security protection is required, preferred, or not needed. Whether to activate encryption protection and/or integrity protection may be determined based on the preference for security protection. Optionally, each security policy may further indicate other more information, for example, a suggestion on strength of a security algorithm. Usually, the security policy may be obtained based on a local SMF configuration, a PCF configuration, a DN configuration, an operator policy, a local policy, a third-party configuration, subscription information or a policy in a UDM, network slice selection assistance information (NSSAI), or the like.

(5) First parameter: The first parameter includes but is not limited to an identifier (ID) of the first session, a slice identifier, NSSAI, a random number, a character string, an algorithm type, an algorithm type identifier, an algorithm type value, a non-access stratum count (NAS Count), a next hop (NH), a packet data convergence protocol count (PDCP COUNT), a character string, and the like. The random number includes a count, a nonce, a random number, or the like. For example, the character string may be an uRLLC indication. In the embodiments of this application, if the first session is at a bearer granularity, the identifier of the first session may be replaced with a bearer identifier (bear ID).

(6) Second parameter: In the embodiments of this application, the second parameter is a parameter used to generate a security key of the second session. The second parameter includes but is not limited to an identifier of the second session, a slice identifier, NSSAI, a random number, a character string, an algorithm type, an algorithm type identifier, an algorithm type value, a NAS count, an NH, a PDCP count, a character string, and the like. The random number includes a count, a nonce, a random number, or the like. For example, the character string may be an uRLLC indication. In the embodiments of this application, if the second session is at a bearer granularity, the identifier of the second session may be replaced with a bearer identifier.

(7) Load of a base station: for example, a maximum quantity of users that can access the base station or bandwidth usage of a user accessing the base station in a specific period of time.

(8) Network deployment policy: for example, capacity deployment of a base station. A capacity affects load or a resource status of the base station.

(9) Resource status of a base station: used to represent a current resource allocation status or usage status of the base station, for example, usage of a resource such as memory of the base station.

FIG. 1 is a schematic diagram of a possible network architecture to which this application is applicable. The network architecture is a 4G network architecture. A network element in the 4G architecture includes a terminal device. In FIG. 1, an example in which the terminal device is user equipment (UE) is used. The network architecture further includes an MME, a serving GPRS support node (SGSN), an HSS, a serving gateway (S-GW), a packet data network gateway (PDN gateway, P-GW), a policy and charging rules function (PCRF) entity, an evolved universal terrestrial radio access network (E-TURAN), and the like.

It should be noted that the UE in this embodiment of this application is a device including mobile equipment (ME) and a security module. The security module may be a universal integrated circuit card (UICC), or may be a secure storage unit integrated in the ME. The UICC includes a universal subscriber identity module (USIM).

The E-UTRAN includes a plurality of evolved NodeBs (eNodeB). The eNodeBs are connected to each other through an X2 interface. The eNodeB interacts with an evolved packet core (EPC) through an S1 interface. The eNodeB and the UE are connected to each other through long term evolution (LTE)-Uu.

A main function of the MME is to support management of NAS signaling and its security and tracking area (TA) list, selection of a P-GW and an S-GW, selection of an MME during an inter-MME handover, selection of an SGSN during a handover to a 2G/3G access system, user authentication, roaming control, bearer management, and mobility management between core network nodes of different 3rd generation partnership project (3GPP) access networks.

The S-GW is a gateway terminating at an E-UTRAN interface. Main functions of the S-GW are as follows: serving as a local anchor and assisting in performing a reordering function of a base station during an inter-base station handover, serving as a mobility anchor during a handover between different 3GPP access systems, performing a lawful interception function, routing and forwarding data packets, tagging packets at uplink and downlink transport layers, used for charging between operators, and the like.

The P-GW is a gateway oriented at a PDN and terminating at a SGi interface. If the UE accesses a plurality of PDNs, the UE corresponds to one or more P-GWs. Main functions of the P-GW include a user-based packet filtering function, a lawful interception function, a UE internet protocol (IP) address allocation function, transmitting and tagging data packets in uplink, performing uplink and downlink service level charging, controlling a service level threshold, controlling uplink and downlink rates based on services, and the like.

The HSS is a database used for storing user subscription information. A home network may include one or more HSSs. The HSS is responsible for storing user-related information, for example, an identifier, a number, routing information, security information, location information, and profile information of a user.

The SGSN may be used for signaling exchange during moving between 2G/3G and E-UTRAN 3GPP access networks, including selection of a P-GW and an S-GW, and selection of an MME for a user handed over to the E-UTRAN 3GPP access network.

The PCRF entity terminates at an Rx interface and a Gx interface. In a non-roaming scenario, only one PCRF in an HPLMN is related to an IP-connectivity access network (IP-CAN) session of UE. In a roaming scenario in which service flows are locally groomed, two PCRFs may be related to an IP-CAN session of one UE.

Figure 2:
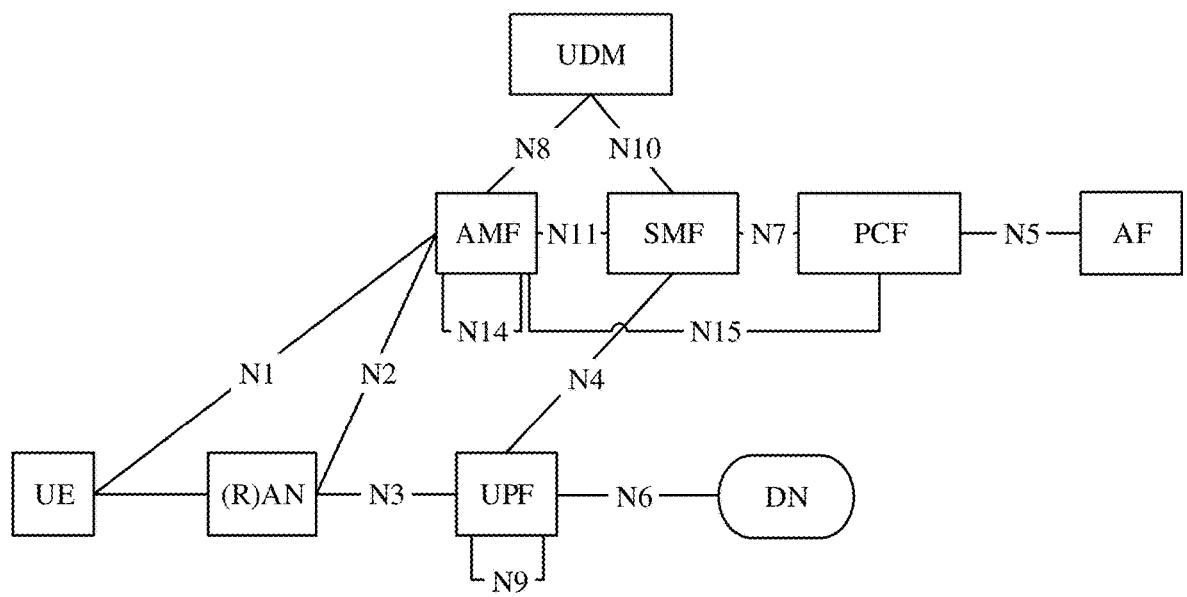
FIG. 2 is a schematic diagram of a network architecture according to an embodiment of this application.

FIG. 2 is a schematic diagram of a network architecture to which this application is applicable. The network architecture is a 5G network architecture. A network element in the 5G architecture includes a terminal device. In FIG. 2, an example in which the terminal device is UE is used. The network architecture further includes a radio access network (RAN), an access and mobility management function (AMF) network element, a session management function (SMF) network element, a user plane function (UPF) network element, a unified data management (UDM) network element, a policy control function (PCF) network element, an application function (AF) network element, a data network (DN), and the like.

A main function of the RAN is to control a user to wirelessly access a mobile communications network. The RAN is a part of a mobile communications system, and implements a radio access technology. Conceptually, the RAN resides between a device (for example, a mobile phone, a computer, or any remote controller) and a core network, and provides a connection between the device and the core network. The RAN may include a base station. For example, the RAN may be a gNB, a NodeB (NB), an evolved NodeB (eNB), a radio network controller (RNC), a base station controller (BSC), a base transceiver station (BTS), a home NodeB (for example, Home eNB, or Home NodeB), a baseband unit (BBU), an access point (AP), a worldwide interoperability for microwave access base station (WiMAX BS), or a relay node. This is not limited in embodiments of this application.

The AMF network element is responsible for terminal access management and mobility management. In actual application, the AMF network element includes a mobility management function in an MME in an LTE network framework, and an access management function is added.

The SMF network element is responsible for session management, for example, session establishment or modification for a user.

The UPF network element is a user plane function network element, is mainly responsible for connecting to an external network, and includes related functions of a serving gateway (SGW) and a public data network gateway (PDN-GW) in LTE.

The DN is a network responsible for providing a service for a terminal. For example, some DNs provide an Internet access function for a terminal, and some other DNs provide an SMS function for a terminal.

The UDM network element may store user subscription information, and an implementation is similar to that of an HSS backend in 4G. In this embodiment of this application, the UDM stores a session context of the UE.

A main function of the PCF network element is to perform policy control. The function includes a function of a policy and charging rules function (PCRF) network element in LTE. The PCF network element is mainly responsible for policy authorization, policy control, generating quality of service and charging rules, and delivering corresponding rules. For example, a service-related session rule is delivered to the SMF network element or another network element to install a corresponding policy and rule.

The AF network element may be a third-party application program function entity or device or an operator's device or entity. The AF network element may provide services for a plurality of application servers.

The terminal device in this application may also be referred to as user equipment (UE), is a device with a wireless transceiver function, and may be deployed on land, including an indoor or outdoor scenario and a handheld or vehicle-mounted scenario, or may be deployed on water (for example, on a steamship), or may be deployed in the air (for example, on an airplane, a balloon, or a satellite). The terminal device may be a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like.

To ensure reliability of uRLLC, two identical data channels need to be established between the UE and the DN, to implement redundant transmission. When a problem occurs on one of the data channels, the other data channel may continue to perform data transmission. Based on the network architectures shown in FIG. 1 and FIG. 2, another network architecture to which the embodiments of this application are applicable may be further derived. The following lists two network architectures to which the embodiments of this application are applicable.

Figure 3A:
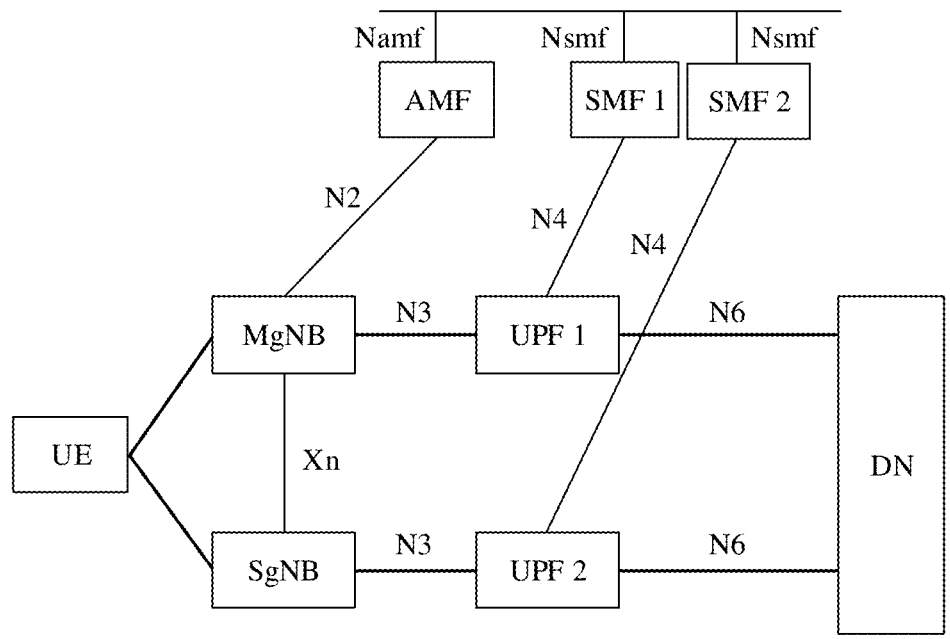
FIG. 3A and FIG. 3B are schematic diagrams of network architectures according to an embodiment of this application.

FIG. 3A shows another network architecture according to an embodiment of this application. In FIG. 3A, a terminal device is UE. The network architecture includes two gNBs that are represented by a master gNB (MgNB) and a secondary gNB (SgNB). Corresponding to the MgNB and the SgNB, the network architecture further includes two UPF network elements that are represented by a UPF 1 and a UPF 2. The network architecture further includes an AMF network element, an SMF, a UPF network element, a UDM network element, and a DN.

For related descriptions of the network elements, refer to the foregoing content. Details are not repeated herein.

As shown in FIG. 3A, two data channels from the UE to the DN may be established by using the two gNBs and the two UPF network elements. One of the data channels is the UE←the MgNB←the UPF 1←the DN. The other data channel is the UE←the SgNB←the UPF 2←the DN. Herein, the data channel may be at a session granularity.

Although not shown, the network architecture shown in FIG. 3A may further include a PCF network element, an AF network element, and the like.

Figure 3B:
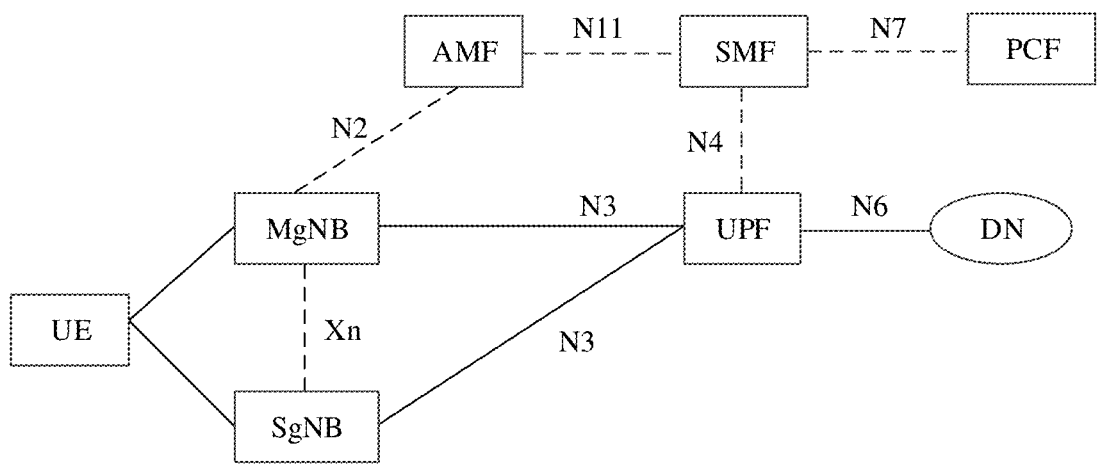

FIG. 3B shows another network architecture according to an embodiment of this application. In FIG. 3B, a terminal device is UE. The network architecture includes two gNBs that are represented by an MgNB and a SgNB. The network architecture further includes a UPF network element, an AMF network element, an SMF, a UPF network element, a UDM network element, and a DN.

As shown in FIG. 3B, two data channels from the UE to the DN may be established by using the two gNBs. One of the data channels is the UE←the MgNB←the UPF←the DN. The other data channel is the UE←the SgNB←the UPF←the DN.

It should be noted that, in the network architectures shown in FIG. 3A and FIG. 3B, the UE is connected to the two gNBs, and the network architectures are two common network architectures in a dual-connectivity scenario. In the network architectures shown in FIG. 3A and FIG. 3B, that a RAN is a gNB is only used as an example. In the embodiments of this application, the RAN is not limited to the gNB, and may be alternatively another type of device, for example, an eNB or an ng-eNB, or may be a device that can implement a same function in the 4G network architecture.

Figure 4:
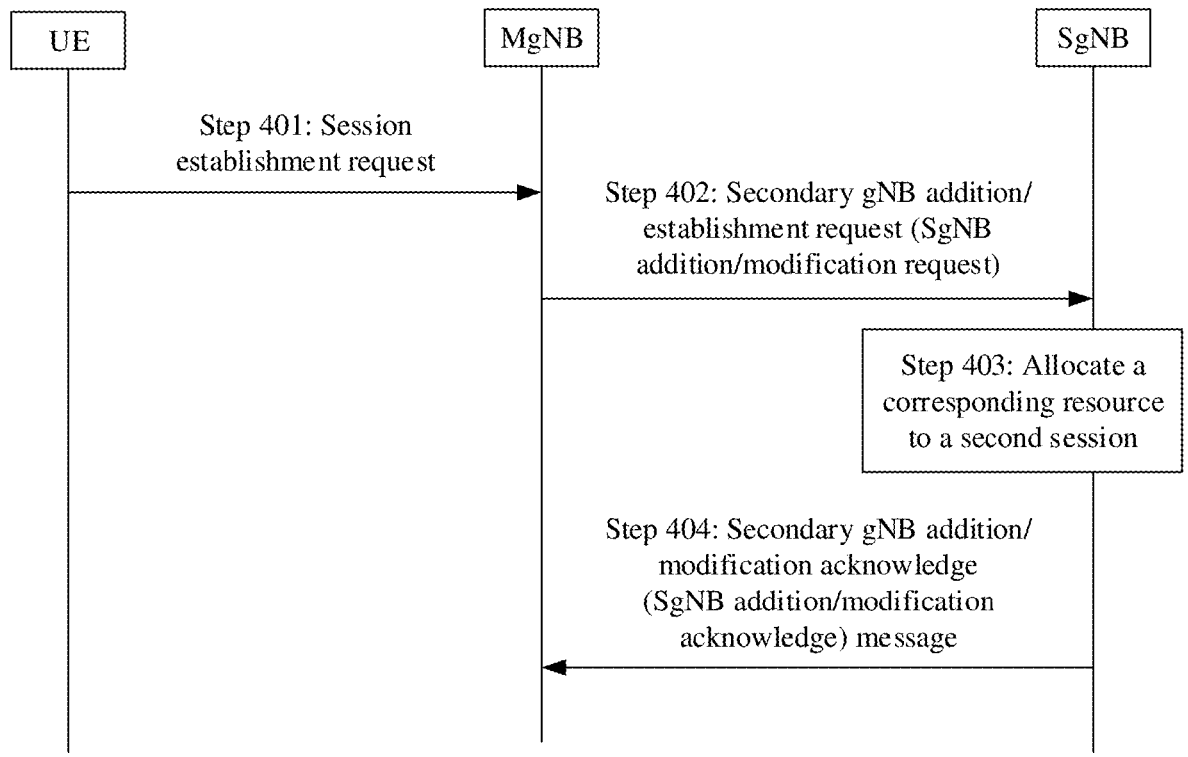
FIG. 4 is a schematic diagram of a method for establishing a data channel in a dual-connectivity scenario according to an embodiment of this application.

Based on the network architectures in FIG. 3A and FIG. 3B, a data channel establishment process in the dual-connectivity scenario is as follows. As shown in FIG. 4, the method includes the following steps.

Step 401: The UE initiates a session establishment procedure, and the UE establishes the first session and the second session with the MgNB. The first session and the second session are redundant sessions of each other.

Step 402: The MgNB sends a secondary gNB addition/establishment request (SgNB addition/modification request) to the SgNB. The secondary gNB addition/modification request carries information about the second session. The information about the second session includes but is not limited to information such as an identifier identifying the second session, slice information corresponding to the second session, QoS flow information corresponding to the session, a user plane security policy obtained from the SMF, and a security capability of the UE.

Step 403: After receiving the secondary gNB addition/establishment request, the SgNB allocates a corresponding resource to the second session, and may select, for the second session, an encryption algorithm and an integrity protection algorithm with highest priorities in a list of the SgNB. The algorithms are also included in the security capability of the UE.

Step 404: The SgNB sends a secondary gNB addition/modification acknowledge (SgNB addition/modification acknowledge) message to the MgNB. The secondary gNB addition/modification acknowledge message is used to indicate that the SgNB has allocated the corresponding resource to the second session. The secondary gNB addition/modification acknowledge message may further indicate the encryption algorithm and the integrity protection algorithm of the second session, and optionally, may further include a resource identifier of the resource allocated to the second session.

Currently, it is merely mentioned that two data channels may be established between the UE and the DN. For example, two protocol data unit (PDU) sessions, bearers, or QoS flows are established. No specific solution has been proposed on how to configure the two data channels or how to configure security keys and security policies used on the two data channels.

To configure the security keys and the security policies used on the two data channels, an embodiment of this application provides a session configuration method. In this embodiment of this application, after receiving redundant transmission security information of a first session from a session management network element, an access network device may send the redundant transmission security information to a terminal device, so that the access network device and the terminal device may generate security keys and security policies based on an indication of the redundant transmission security information, and configuration for two sessions used for redundant transmission may be implemented.

Figure 5:
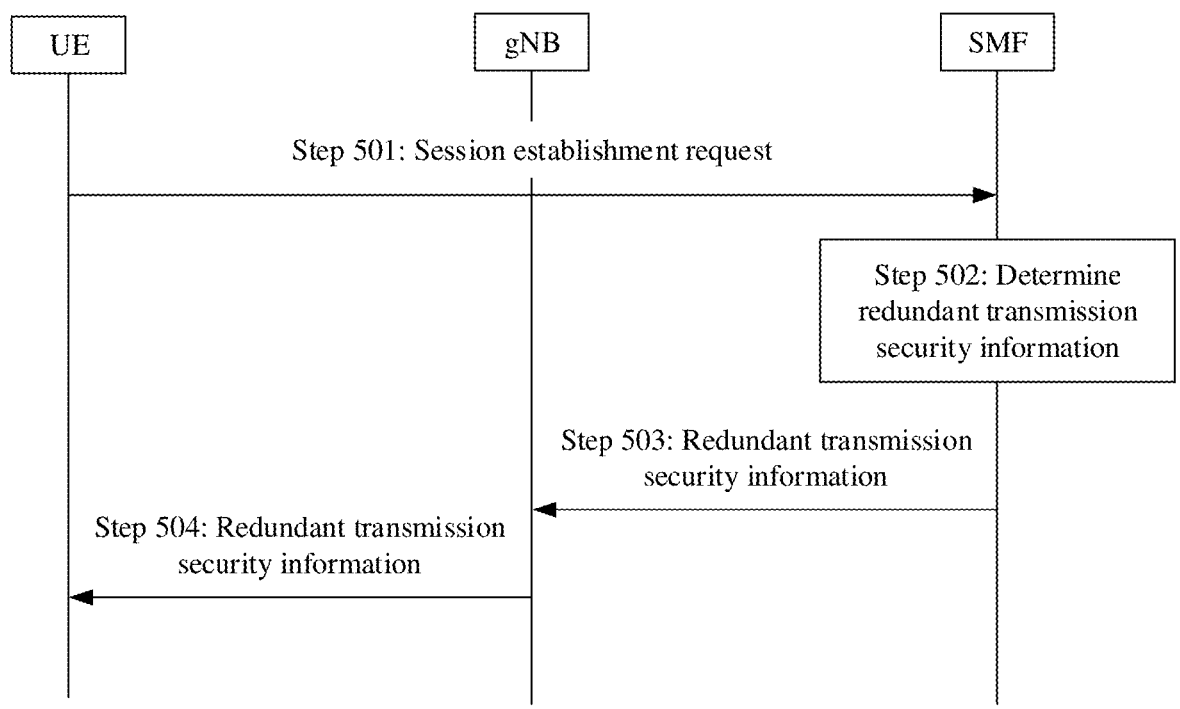
FIG. 5 is a schematic diagram of a network configuration method according to an embodiment of this application.

Based on the network architectures shown in FIG. 1 to FIG. 3B, a session configuration method provided in an embodiment of this application is described by using an example in which an access network device is the gNB, a session management network element is the SMF network element, and a terminal device is the UE. As shown in FIG. 5, the method includes the following steps.

Step 501: The UE sends a session establishment request to the SMF network element. The session establishment request is used to request to establish the first session.

For example, the UE sends the session establishment request to the AMF network element by using the gNB, and the AMF network element may send the session establishment request to the SMF network element after selecting the corresponding SMF network element.

Step 502: After receiving the session establishment request, the SMF network element determines redundant transmission security information of the first session. The redundant transmission security information is used to indicate security keys and security policies of the first session and a second session. The second session is a redundant session of the first session.

In an example embodiment, the session establishment request sent by the UE carries indication information indicating that the first session is used for redundant transmission. After receiving the session establishment request, the SMF network element determines, based on the indication information, that the first session is used for redundant transmission.

In another example embodiment, the session establishment request sent by the UE may alternatively not include an indication message indicating that the first session is used for redundant transmission. Instead, after receiving the session establishment request, the SMF network element determines, based on one or more of slice information such as NSSAI, DN information, and UE subscription information on the UDM network element, that the first session is a session for redundant transmission; and generates indication information used to indicate that the first session is a session for redundant transmission. The indication message may be locally stored on the SMF network element as information about the first session.

There are many manners of indicating, by the indication information, that the first session is used for redundant transmission. The indication may be a redundant transmission/session indication. Different values of the field may indicate different content. For example, when the redundant transmission/session indication is 1, it indicates that the first session is the $1^{st}$ session used for redundant transmission, or indicates that the first session requires redundancy and the $1^{st}$ session for redundant transmission is currently being established. In this case, after the first session is established, another session used for redundant transmission needs to be established. When the redundant transmission/session indication is 2, it indicates that the first session is the $2^{nd}$ session used for redundant transmission. In this case, a session used for redundant transmission has been established before the first session is established (for ease of description, the second session is used to identify the session that is used for redundant transmission and that has been established before the first session is established). The indication information may further carry an identifier of the second session. It should be understood that the redundant transmission/session indication may be alternatively 0, indicating that the first session does not require redundancy, or the like. A specific value of the redundant transmission/session indication is not limited, provided that a same function is represented. For another example, the indication information may indicate that the first session is used to support an uRLLC service, or the indication information indicates that a session type of the first session is an uRLLC service. The foregoing indication manners are merely examples, and are not limited in embodiments of this application.

In this embodiment of this application, the redundant transmission security information is used to indicate the security keys and the security policies of the first session and the second session. For example, the redundant transmission security information may indicate that a security key and a security policy of the first session are the same as those of the second session, or the redundant transmission security information may indicate that a security key and a security policy of the first session are different from those of the second session. Alternatively, the redundant transmission security information may indicate that the security keys and the security policies of the first session and the second session are determined by the gNB. For this manner, refer to an embodiment shown in FIG. 7.

There are many manners of determining the redundant transmission security information by the SMF network element. For example, the SMF network element determines the redundant transmission security information based on subscription information of the UE, an operator configuration, a local configuration, third-party service policy information, DN information, and/or slice-related information such as NSSAI. Three manners are listed below.

In a first manner, the SMF network element determines the redundant transmission security information based on the subscription information of the UE.

When the UE subscribes to a network, the subscription information of the UE may include the redundant transmission security information. After receiving the session establishment request, the SMF network element may obtain the subscription information of the UE from the UDM network element, and then determine the redundant transmission security information based on the obtained subscription information of the UE.

In a second manner, the SMF network element determines the redundant transmission security information based on a current network status. The network status is used to represent a status such as load or a security capability of a network.

When the first session needs to be used for redundant transmission, the second session is necessarily required as a redundant session of the first session. This occupies a specific network resource, and affects network load.

If current network load is relatively low and a relatively large quantity of network resources are available, the SMF network element may determine that the first session may be used for redundant transmission. If current network security is relatively low, to ensure data transmission security, the security key and the security policy of the first session may be set to be different from those of the second session, so that data isolation can be implemented. If current network security is relatively high, the security key and the security policy of the first session may be set to be the same as those of the second session, so that data transmission security can be ensured, and resources can be saved.

If the current network status is not suitable for redundant transmission, for example, if the current network load is relatively high and a relatively small quantity of network resources are available, the SMF network element may establish the first session for the UE according to an existing procedure.

In a third manner, the SMF network element determines the redundant transmission security information by using another network element.

For example, the another network element is an AF network element. The SMF network element may interact with the AF network element to determine the redundant transmission security information based on an indication of the AF network element.

For example, the AF network element is an application server of a specific slice, and the slice needs to provide high security. Even for redundantly transmitted data, security isolation of two sessions needs to be ensured. In this case, a security requirement can be met by using different security keys and different security policies.

The foregoing three manners are merely examples for description. A manner of determining the redundant transmission security information by the SMF network element is not limited in embodiments of this application.

The redundant transmission security information indicates the security keys and the security policies of the first session and the second session. The SMF network element further needs to determine a redundant session of the first session, that is, the SMF network element needs to determine which session is the second session.

In an example embodiment, the second session may be a session that has been established before the UE initiates the session establishment request, and the SMF network element may determine the second session based on the session establishment request. For example, when the UE initiates the session establishment request, the session establishment request may carry the identifier of the second session. Alternatively, when the second session is established, the SMF network element may record related information of the second session, for example, the identifier of the second session, and that the second session is used for redundant transmission. When the UE initiates the session establishment request, after receiving the session establishment request, the SMF network element may determine, based on locally recorded information, that the second session is a redundant session of the first session.

In another example embodiment, the second session may be a session established for the UE after the UE initiates the session establishment request. Similar to the foregoing manner, the SMF network element may determine the second session based on a session establishment request that is sent by the UE and that is used to request to establish the second session. For example, when the UE initiates the session establishment request, the session establishment request may carry an identifier of the first session, to indicate that the second session and the first session are redundant sessions of each other, and further determine that the currently established second session is a redundant session of the first session. Alternatively, when the first session is established, the SMF network element may record related information such as the identifier of the first session, and that the first session is used for redundant transmission. When the UE initiates the session establishment request used to request to establish the second session, after receiving the session establishment request, the SMF network element may determine, based on locally recorded information, that the second session is a redundant session of the first session.

After determining the redundant transmission security information, the SMF network element may perform step 503.

Step 503: The SMF network element sends the redundant transmission security information to the gNB.

The SMF network element may send the redundant transmission security information to the gNB by using the AMF network element.

Step 504: After receiving the redundant transmission security information, the gNB sends the redundant transmission security information to the UE.

After receiving the redundant transmission information, the gNB may configure the security keys and the security policies for the first session and the second session based on the redundant transmission security information. Correspondingly, the UE also needs to configure the security keys and the security policies for the first session and the second session based on the redundant transmission security information.

Based on different content indicated by the redundant transmission information, there may be specifically the following two cases.

Case 1: The redundant transmission security information indicates that the security key and the security policy of the first session are the same as those of the second session.

The gNB configures a same security key and a same security policy for the first session and the second session.

For example, the second session is a session established before the UE initiates the session establishment request. The gNB may query the security key and the security policy of the second session, and configure, for the first session, a security key and a security policy that are the same as those of the second session.

If the second session is a session that needs to be established by the UE after the first session is established, similar to the foregoing manner, the gNB may query the security key and the security policy of the first session, and configure the same security key and the same security policy for the second session.

Correspondingly, when receiving the redundant transmission security information, the UE configures the same security key and the same security policy for the first session and the second session. An operation performed by the UE is the same as that performed on the gNB side. For details, refer to the foregoing content. Details are not repeated herein.

Based on the network architecture in FIG. 3A or FIG. 3B, the gNB includes two gNBs configured to construct two data channels, and the two gNBs are the MgNB and the SgNB. The SMF network element may send the redundant transmission security information to one of the gNBs. The following provides descriptions by using an example in which the SMF network element may send the redundant transmission security information to the MgNB, a data channel established by using the MgNB is the first session, and a data channel established by using the SgNB is the second session.

Figure 6:
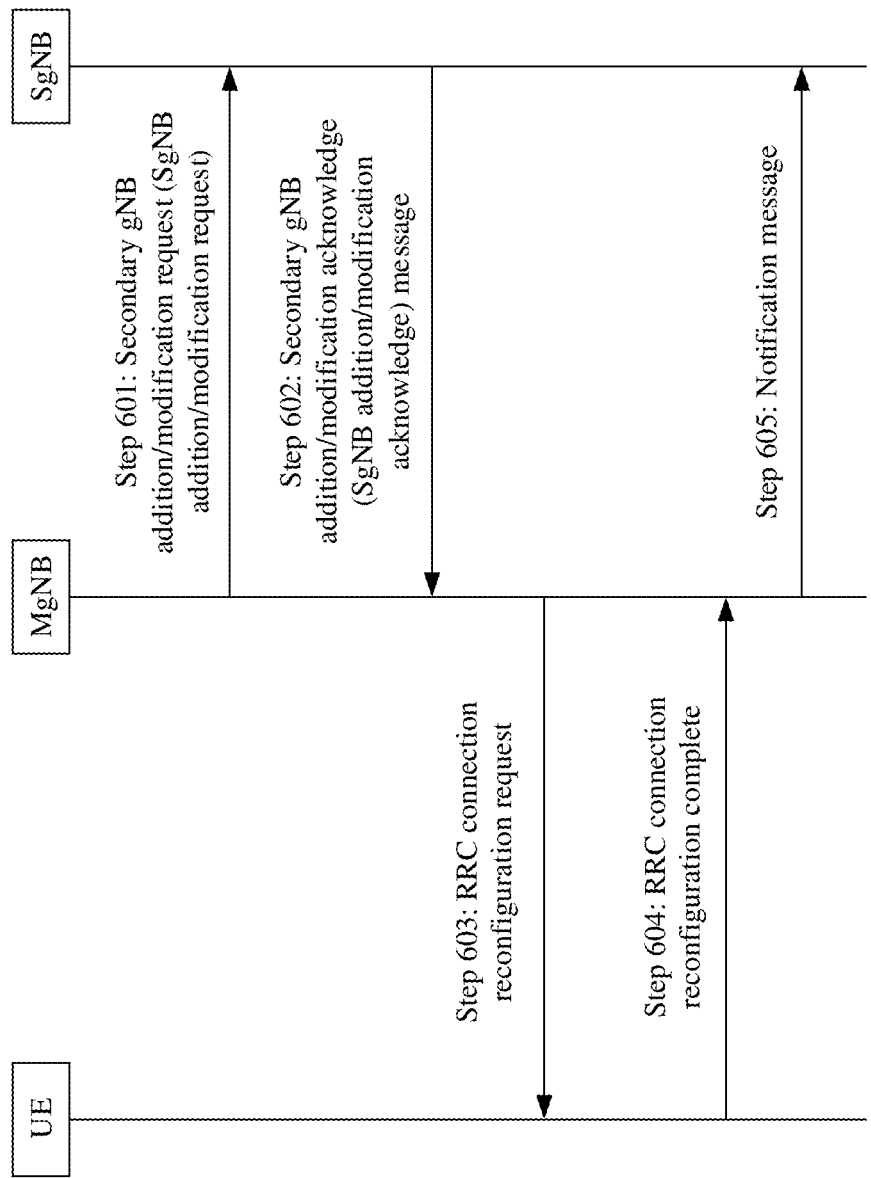
FIG. 6 is a schematic diagram of a network configuration method according to an embodiment of this application.

FIG. 6 shows a session configuration method according to an embodiment of this application. The method includes the following steps.

Step 601: If the MgNB determines that the redundant transmission security information indicates that the security key and the security policy of the first session are the same as those of the second session, the MgNB may send, to the SgNB, a security key of the first session that is configured on the MgNB side, for example, $K_{Upenc}$ and $K_{Upint}$; and the MgNB may send, to the SgNB, a security policy of the first session that is configured on the MgNB side. Optionally, the MgNB may alternatively send an indication message to the SgNB. The indication message may indicate that the first session and the second session are redundant sessions of each other, and may further indicate that the security key and the security policy of the first session are the same as those of the second session.

For example, the MgNB may add the security key of the first session to a secondary gNB addition/modification request (SgNB addition/modification request), and then send the secondary gNB addition/modification request to the SgNB. The security policy of the first session may also be carried in the secondary gNB addition/modification request.

Step 602: After receiving the security policy and the security key of the first session, the SgNB may directly configure the security policy and the security key of the second session, or may configure the security policy and the security key of the second session after subsequently receiving a notification message from the MgNB. The notification message may indicate that the UE has completed configuration, or may indicate the SgNB to activate configuration of the second session.

The SgNB sends a secondary gNB addition/modification acknowledge (SgNB addition/modification acknowledge) message to the MgNB. The secondary gNB addition/modification acknowledge message is used to indicate that the SgNB has determined that the security policy and the security key of the first session are received, and may further indicate that the SgNB may configure, for the second session, a security policy and a security key that are the same as those of the first session. If the SgNB has completed the configuration of the security policy and the security key of the second session, the secondary gNB addition/modification acknowledge message may be further used to indicate that the configuration of the security policy and the security key of the second session is completed.

Step 603: After receiving the secondary gNB addition/modification acknowledge message, the MgNB may send the redundant transmission security information to the UE. After receiving the redundant transmission security information, the UE configures the security keys and the security policies of the first session and the second session based on the redundant transmission security information. For example, the redundant transmission security information may be carried in a radio resource control (RRC) message, for example, an RRC connection reconfiguration request.

Step 604: After completing the configuration of the security keys and the security policies of the first session and the second session, the UE sends an acknowledge message to the MgNB. The acknowledge message may also be an RRC message. For example, the acknowledge message may be an RRC connection reconfiguration complete message.

Step 605: After receiving the acknowledge message from the UE, the MgNB may send a notification message to the SgNB.

Case 2: The redundant transmission security information indicates that the security key and the security policy of the first session are different from those of the second session.

The gNB configures different security keys and different security policies for the first session and the second session.

For the security keys, the gNB may generate the security key of the first session and the security key of the second session in different security key generation manners. A security key generation manner is not limited in embodiments of this application. Any manner in which the security key of the first session is different from the security key of the second session is applicable to this embodiment of this application.

For example, the gNB may generate the security key of the first session based on a first parameter, and generate the security key of the second session based on a second parameter.

The gNB may send the first parameter and the second parameter to the UE. The UE may configure the security keys for the first session and the second session based on the redundant transmission security information and based on the first parameter and the second parameter. For example, after receiving the first parameter and the second parameter, the UE generates the security key of the first session based on the first parameter, and generates the security key of the second session based on the second parameter.

The following describes two methods for generating the security keys of the first session and the second session.

(1) Generate, through derivation based on a security key of an established session in the first session and the second session, a security key of a session whose establishment has not been completed in the first session and the second session.

If the second session is a session established before the UE initiates the session establishment request, when establishing the first session, the gNB may query the security key of the second session, and continue to generate, through derivation, the security key of the first session based on the security key of the second session. When the gNB continues to generate, through derivation, the security key of the first session based on the security key of the second session, the first parameter may be introduced, and the security key of the first session is generated based on the security key of the second session and the first parameter.

For example, an integrity protection key of the second session is $K_{UPint}$, and an encryption key of the second session is $K_{UPenc}$. The $K_{UPint}$ and the $K_{UPenc}$ may be an integrity protection key and an encryption key that are configured when an existing session is established, or may be an integrity protection key and an encryption key that are generated by the gNB in another manner. The gNB may generate, through derivation, an integrity protection key and an encryption key of the first session based on the $K_{UPint}$ and the $K_{UPenc}$. The integrity protection key of the first session is as follows: $K_{UPint\text{-}session\ 1}$=KDF ($K_{UPint}$, the first parameter).

The gNB sends the first parameter to the UE. The UE generates the security key of the first session in a same manner as that used by the gNB.

Optionally, if the UE already owns some parameters of the first parameter, for example, a NAS count, the gNB may not send the parameters to the UE.

If the second session is a session that needs to be established by the UE after the first session is established, when establishing the second session, the gNB may query the security key of the first session, and continue to generate, through derivation, the security key of the second session based on the security key of the first session. When the gNB continues to generate, through derivation, the security key of the second session based on the security key of the first session, the second parameter may be introduced.

The gNB sends the second parameter to the UE. The UE generates the security key of the second session in a same manner as that used by the gNB.

Optionally, if the UE already owns some parameters of the second parameter, for example, a NAS count, the gNB may not send the parameters to the UE.

(2) Derive different security keys based on an intermediate key or a key derived from the intermediate key, and configure the different security keys for the first session and the second session. The intermediate key may include $K_{AMF}$, $K_{MgNB}$, or $K_{SgNB}$.

In an example embodiment, the gNB may generate a plurality of different security keys based on $K_{gNB}$. When receiving the redundant transmission security information, the gNB may select different security keys from the plurality of different security keys as the security keys of the first session and the second session. For example, $K_{Upint\text{-}session}$=KDF (KgNB, the first parameter or the second parameter, or the like). The KgNB may be the $K_{MgNB}$ or the $K_{SgNB}$. When a security key is generated on the MgNB side, the $K_{MgNB}$ may be used. When a security key is generated on the SgNB side, the $K_{SgNB}$ may be used.

In another example embodiment, the AMF network element may generate a plurality of different $K_{gNB}$ based on the $K_{AMF}$, and send the generated plurality of different $K_{gNB}$ to the gNB. The gNB may generate a plurality of different security keys based on the different $K_{gNB}$. When receiving the redundant transmission security information, the gNB may select security keys from the plurality of different security keys as the security keys of the first session and the second session.

In another example embodiment, the AMF network element may alternatively derive a key based on an intermediate key (for example, $K_{AMF}$), and send the key derived based on the intermediate key (for example, $K_{AMF}$) to the gNB. The gNB continues to generate, through derivation, a security key of a session (for example, the first session or the second session) based on the key derived based on the intermediate key.

For example, the AMF network element may generate a plurality of keys $K_{uRLLC}$ based on the $K_{AMF}$, for example, $K_{uRLLC}$=KDF ($K_{AMF}$, a third parameter). The AMF network element sends the generated $K_{uRLLC}$ to the gNB (for example, the MgNB and the SgNB). The third parameter is a parameter unknown to the gNB and the UE. The third parameter includes but is not limited to a session identifier, a slice identifier, NSSAI, a random number, a character string, an algorithm type, an algorithm type identifier, an algorithm type value, a NAS count, an NH, a PDCP count, a character string, a NAS connection identifier, a service type, and the like. In this embodiment of this application, if a session is at a bearer granularity, the session identifier may be replaced with a bearer identifier. In input parameters of different $K_{uRLLC}$, the session identifier, the NAS count, and the slice identifier may vary, and the random number may also vary.

When sending the generated $K_{uRLLC}$ to the gNB, the AMF network element may determine which gNBs are gNBs that subsequently need to establish sessions used for redundant transmission, and separately send the plurality of $K_{uRLLC}$ to the determined gNBs.

Optionally, the AMF may alternatively send all $K_{uRLLC}$ to one master gNB. When subsequently performing a secondary gNB addition/modification operation, the master gNB adds $K_{uRLLC}$ to a secondary gNB addition/modification request and sends the request to a corresponding secondary gNB. Each secondary gNB may obtain one or more $K_{uRLLC}$.

It should be noted that the security key of the first session or the second session is generated through further derivation based on a key derived from an intermediate key. The UE stores no key derived from the intermediate key. The gNB needs to send, to the UE, the third parameter required for generating the key derived based on the intermediate key. The UE generates a key based on the intermediate key and based on the third parameter, and then generates, through derivation, a security key of a corresponding session (for example, the first session or the second session) based on the key derived from the intermediate key.

It should be understood that, when the gNB generates the security key of the first session, the first parameter is introduced, and the first parameter needs to be sent to the UE. Correspondingly, when the security key of the second session is generated, the second parameter is introduced, and the second parameter needs to be sent to the UE. Usually, the gNB and the UE exchange the $K_{gNB}$ that needs to be used for generating the security key. Herein, the first parameter and the second parameter are newly introduced parameters, other than the $K_{gNB}$, that are not learned by the UE and the gNB in advance. Other parameters that have been learned by the UE and the gNB in advance, for example, a session ID, may not be sent. The UE and the gNB usually add the session ID to a message in a session establishment process. If both the UE and the gNB already have the session ID, the session ID does not need to be sent.

With reference to a specific network architecture, in the network architectures shown in FIG. 3A and FIG. 3B, there are the MgNB and the SgNB, and there are two different data channels corresponding to two different sessions (corresponding to the first session and the second session in this embodiment of this application).

If the AMF network element has an interface to each of the MgNB and the SgNB, and a corresponding NAS count used to generate a security key is maintained, the AMF network element generates, based on $K_{AMF}$, $K_{MgNB}$ as $K_{gNB}$ for the MgNB; and generates, based on the $K_{AMF}$, $K_{SgNB}$ as $K_{gNB}$ for the SgNB. In this case, the AMF network element sends the $K_{MgNB}$ to the MgNB and sends the $K_{SgNB}$ to the SgNB by using corresponding interfaces. Then the MgNB may generate a security key based on the $K_{MgNB}$, and the SgNB may generate a security key based on the $K_{SgNB}$.

If the AMF network element has an interface only to one gNB of the MgNB and the SgNB, for example, the AMF network element has an interface only to the MgNB, the MgNB and the SgNB may generate security keys in respective manners.

In an example embodiment, the MgNB may generate the $K_{MgNB}$ by itself (for example, generated by using the $K_{AMF}$ based on the NAS count), or may obtain the $K_{AMF}$ (the $K_{AMF}$ is sent by the AMF network element to the MgNB). The MgNB may send the $K_{AMF}$ to the SgNB, or may send the $K_{MgNB}$ to the SgNB, or may send a key derived from the $K_{AMF}$ or the $K_{MgNB}$ (the generated key is denoted as the $K_{SgNB}$) to the SgNB. After receiving the key (for example, the $K_{AMF}$, the $K_{MgNB}$, or the $K_{SgNB}$) sent by the MgNB, the SgNB may generate a corresponding security key based on the received key (for example, the $K_{AMF}$, the $K_{MgNB}$, or the $K_{SgNB}$). For generation of the security key, refer to the foregoing method for generating the $K_{Upint}$ and the $K_{Upenc}$. Details are not repeated herein.

When generating the $K_{SgNB}$, the MgNB may perform derivation based on the $K_{AMF}$ in combination with another parameter, for example, $K_{SgNB}$=KDF ($K_{AMF}$, a fourth parameter). The fourth parameter includes but is not limited to an SgNB ID, an SgNB counter, a random number, a character string length of the SgNB counter, an NH, a slice ID, NSSAI, a character string, a PDCP count, a service type, a NAS count, and the like. The SgNB ID is an identifier of the SgNB. A specific type of the identifier is not limited in embodiments of this application. Any identifier that can indicate the SgNB is applicable to this embodiment of this application. The SgNB counter is a quantity of SgNBs currently accessing the MgNB. For one MgNB, a plurality of SgNBs may be used for offloading for the MgNB. Each time one SgNB accesses the MgNB, the SgNB counter is correspondingly incremented by 1. For descriptions of the random number and the character string, refer to the foregoing content. Details are not repeated herein.

In the foregoing manner, the MgNB may generate the $K_{SgNB}$ in a specific manner, and then generate a security key based on the $K_{SgNB}$. This can ensure that security keys generated by the MgNB and the SgNB are isolated, and further ensure data transmission security.

For the security policies, the gNB configures different security policies for the first session and the second session.

If the second session is a session established before the UE initiates the session establishment request, the gNB may query the security policy of the second session, and configure, for the first session, a security policy different from that of the second session.

If the second session is a session that needs to be established by the UE after the first session is established, when establishing the second session, the gNB queries the security policy of the first session, and configures, for the second session, a security policy different from that of the first session.

For one session (for example, the first session or the second session), the gNB and the UE need to use a same security policy, and the gNB needs to send the security policy of the first session and the security policy of the second session to the terminal device. The UE receives the security policies of the first session and the second session from the gNB, and the UE configures the security policies for the first session and the second session based on the redundant transmission security information and based on the security policies of the first session and the second session.

With reference to a specific network architecture, in the network architectures shown in FIG. 3A and FIG. 3B, there are the MgNB and the SgNB, and there are two different data channels corresponding to two different sessions (corresponding to the first session and the second session in this embodiment of this application). The following provides descriptions by using an example in which the SMF network element may send the redundant transmission security information to the MgNB, a data channel established by using the MgNB is the first session, and a data channel established by using the SgNB is the second session.

If the MgNB determines that the redundant transmission security information indicates that the security key and the security policy of the first session are different from those of the second session, the MgNB sends, to the SgNB, the second parameter or an intermediate key used to generate the security key of the second session, for example, $K_{SgNB}$ or $K_{AMF}$. The MgNB may further predetermine the security policy of the second session, and send the security policy of the second session to the SgNB.

For example, the MgNB may add the second parameter or the intermediate key used to generate the security key of the second session to a secondary gNB addition/establishment request, and then send the secondary gNB modification/establishment request to the SgNB. The security policy of the second session may also be carried in the secondary gNB addition/establishment request.

After receiving the second parameter or the intermediate key used to generate the security key of the second session, the SgNB may directly configure the security policy and the security key of the second session, or may configure the security policy and the security key of the second session after subsequently receiving a notification message from the MgNB. The notification message may indicate that the UE has completed configuration, or may indicate the SgNB to activate configuration of the second session.

The SgNB sends a secondary gNB addition/modification acknowledge (SgNB addition/modification acknowledge) message to the MgNB. The secondary gNB addition/modification acknowledge message is used to indicate that the SgNB has determined that a message sent by the MgNB is received, and may further indicate that the SgNB may configure, for the second session, a security policy and a security key that are different from those of the first session. If the SgNB has completed the configuration of the security policy and the security key of the second session, the secondary gNB addition/modification acknowledge message may be further used to indicate that the configuration of the security policy and the security key of the second session is completed.

After receiving the secondary gNB addition/modification acknowledge message, the MgNB may send the redundant transmission security information to the UE. After receiving the redundant transmission security information, the UE configures the security keys and the security policies of the first session and the second session based on the redundant transmission security information. For example, the redundant transmission security information may be carried in an RRC message, for example, an RRC configuration request. The MgNB further sends the security policy of the first session and the security policy of the second session to the UE. If the first parameter is introduced when the security key of the first session is generated, the MgNB further sends the first parameter to the UE. If the second parameter is introduced when the security key of the second session is generated, the MgNB further sends the second parameter to the UE. The redundant transmission security information, the security policy of the first session, the security policy of the second session, the first parameter, or the second parameter may be carried in one message and sent to the UE.

After completing the configuration of the security keys and the security policies of the first session and the second session, the UE sends an acknowledge message to the MgNB. The acknowledge message may also be sent by using an RRC message. For example, the acknowledge message may be an RRC connection reconfiguration complete message.

After receiving the acknowledge message from the UE, the MgNB may send the notification message to the SgNB.

In the foregoing example, the data channel is at a session granularity. Actually, the data channel may be alternatively at a QoS flow granularity. To be specific, two QoS flows, such as a first QoS flow and a second QoS flow, are established in one session to transmit same data. A process of configuring security keys and security policies for the QoS flows is similar to that of the session configuration manner shown in FIG. 5. The first QoS flow corresponds to the first session, and the second QoS flow corresponds to the second session. Details are not repeated herein. A difference is as follows: In a session establishment process of the SMF network element, redundant QoS flows, that is, the first QoS flow and the second QoS flow, may be determined based on subscription information of the UE and information such as a QoS level policy in the PCF network element and based on QoS flows corresponding to a to-be-established session. The subscription information of the UE may be obtained by the SMF network element from the UDM network element, and the information such as the QoS level policy may be obtained by the SMF from the UDM, or may be obtained by the SMF network element from the PCF network element. The SMF network element sends the redundant transmission security information to the gNB. The redundant transmission security information indicates the security keys and the security policies of the first QoS flow and the second QoS flow.

In the foregoing descriptions, that the redundant transmission security information indicates that the security key and the security policy of the first session are different from those of the second session means that the security policy of the first session is different from that of the second session, and the security key of the first session is different from that of the second session. Actually, the redundant transmission security information may indicate that the security policy of the first session is the same as that of the second session and the security key of the first session is different from that of the second session, or may indicate that the security policy of the first session is different from that of the second session and the security key of the first session is the same as that of the second session.

The gNB and the UE may perform corresponding operations based on the indication of the redundant transmission security information. For example, the redundant transmission security information may indicate that the security policy of the first session is the same as that of the second session or the security key of the first session is different from that of the second session, so that different security keys or the same security key are configured for the first session and the second session accordingly. For example, the redundant transmission security information may indicate that the security policy of the first session is different from that of the second session or the security key of the first session is the same as that of the second session, and hence the same security key or different security keys are configured for the first session and the second session accordingly. For a specific configuration manner, refer to the foregoing content. Details are not repeated herein.

In an example embodiment, the redundant transmission security information indicates that the security keys and the security policies of the first session and the second session are determined by the gNB.

Figure 7:
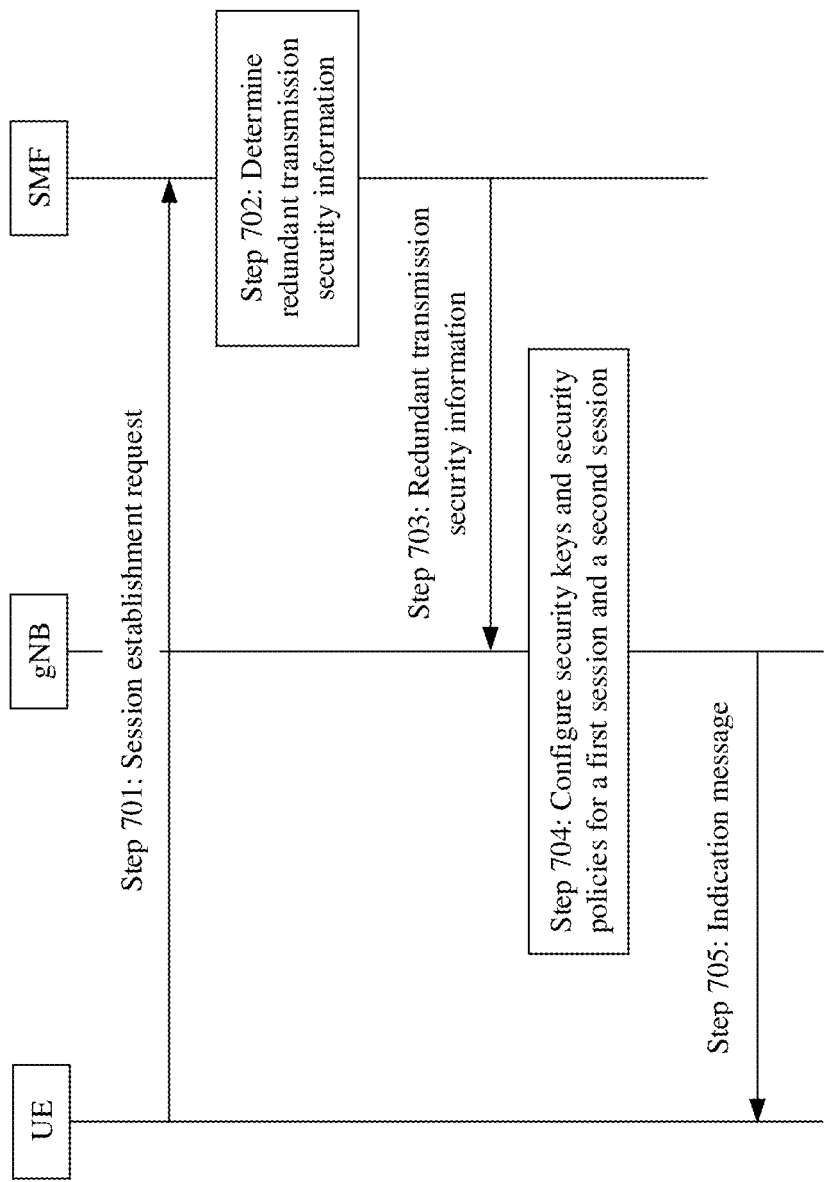
FIG. 7 is a schematic diagram of a network configuration method according to an embodiment of this application.

The following describes this case. As shown in FIG. 7, another session configuration method provided in an embodiment of this application is described by using an example in which an access network device is the gNB, a session management network element is the SMF network element, and a terminal device is the UE. The method includes the following steps.

Step 701: The UE sends a session establishment request to the SMF network element. The session establishment request is used to request to establish the first session. This step is the same as step 501 in the embodiment shown in FIG. 5. Details are not repeated herein.

Step 702: After receiving the session establishment request, the SMF network element determines redundant transmission security information of the first session. The redundant transmission security information indicates that security keys and security policies of the first session and a second session are determined by the gNB. This step is similar to step 502 in the embodiment shown in FIG. 5. A difference lies in that content that the redundant transmission security information determined by the SMF network element is used to indicate varies. Details are not repeated herein. For details, refer to the foregoing content.

Step 703: The SMF network element sends the redundant transmission security information to the gNB, and the gNB receives the redundant transmission security information.

Step 704: The gNB configures the security keys and the security policies for the first session and the second session. The second session is a redundant session of the first session.

Because the redundant transmission security information is used to indicate that the security keys and the security policies of the first session and the second session are determined by the gNB, the gNB may determine, according to a first rule, the security keys and the security policies configured for the first session and the second session.

The first rule may include some or all of the following: load of the gNB, a network deployment policy, or a resource status of the gNB.

If current load of the gNB is excessively large, to save resources, the gNB may configure a same security key and a same security policy for the first session and the second session. When current load of the gNB is relatively low, to ensure data transmission reliability, the gNB may configure different security keys and different security policies for the first session and the second session.

If the resource status of the gNB indicates that a relatively small quantity of resources are currently available for the gNB, the gNB may configure a same security key and a same security policy for the first session and the second session. When the resource status of the gNB indicates that a relatively large quantity of resources are currently available for the gNB, to ensure data transmission reliability, the gNB may configure different security keys and different security policies for the first session and the second session.

If the network deployment policy indicates that the gNB needs to ensure data transmission reliability, the gNB may configure different security keys and different security policies for the first session and the second session. If the network deployment policy has no reliability requirement for data transmission of the gNB, the gNB may configure a same security key and a same security policy for the first session and the second session.

Step 705: The gNB sends an indication message to the UE. The indication message is used to indicate the security keys and the security policies of the first session and the second session.

After configuring the security keys and the security policies for the first session and the second session, the gNB needs to notify the UE of whether a security key and a security policy configured for the first session are the same as those configured for the second session.

A relationship, determined by the gNB, between the security key and the security policy of the first session and those of the second session may have the following four cases.

(1) The security key and the security policy of the first session are the same as those of the second session. Correspondingly, the indication message is used to indicate that the security key and the security policy of the first session are the same as those of the second session.

(2) The security key and the security policy of the first session are different from those of the second session. Correspondingly, the indication message is used to indicate that the security key and the security policy of the first session are different from those of the second session.

(3) The security key of the first session is different from that of the second session, and the security policy of the first session is the same as that of the second session. Correspondingly, the indication message is used to indicate that the security key of the first session is different from that of the second session and the security policy of the first session is the same as that of the second session.

(4) The security key of the first session is the same as that of the second session, and the security policy of the first session is different from that of the second session. Correspondingly, the indication message is used to indicate that the security key of the first session is the same as that of the second session, and the security policy of the first session is different from that of the second session.

In the foregoing four cases, for a method for specifically configuring the security keys and the security policies by the gNB and the UE for the first session and the second session, refer to the embodiment shown in FIG. 5. Details are not repeated herein.

For the security policies, if the security policy configured by the gNB for the first session is different from that configured by the gNB for the second session, after configuring the security policies for the first session and the second session, the gNB sends the security policies of the first session and the second session to the UE. After receiving the security policies of the first session and the second session, the UE configures the security policies for the first session and the second session based on the indication message and based on the security policies of the first session and the second session.

For the security keys, if the security key configured by the gNB for the first session is different from that configured by the gNB for the second session, the gNB may send, to the UE, a first parameter used to generate the security key of the first session and a second parameter used to generate the security key of the second session. After receiving the first parameter and the second parameter, the UE configures the security keys for the first session and the second session based on the indication message and based on the first parameter and the second parameter. To be specific, the UE generates the security key of the first session based on the first parameter, and the UE generates the security key of the second session based on the second parameter.

For descriptions of the first parameter and the second parameter, refer to related descriptions in the embodiment shown in FIG. 5. Details are not repeated herein.

It should be noted that, when the redundant transmission security information indicates that the security key and the security policy of the first session are different from or the same as those of the second session, after receiving the redundant transmission security information, the gNB may alternatively not configure the security keys and the security policies for the first session and the second session based on the redundant transmission security information, but autonomously determine the security keys and the security policies configured for the first session and the second session (for example, determine the security keys and the security policies of the first session and the second session according to the first rule), and perform configuration.

With reference to the network architectures shown in FIG. 3A and FIG. 3B, there are the MgNB and the SgNB, and there are two different data channels corresponding to two different sessions (corresponding to the first session and the second session in this embodiment of this application). The following provides descriptions by using an example in which the SMF network element may send the redundant transmission security information to the MgNB, a data channel established by using the MgNB is the first session, and a data channel established by using the SgNB is the second session.

The following separately describes cases in which the MgNB determines, after receiving the redundant transmission security information, that the security key and the security policy of the first session are the same as or different from those of the second session.

(1) The security key and the security policy of the first session are the same as those of the second session.

After determining that the security key and the security policy of the first session are the same as those of the second session, the MgNB may send a first indication message to the SgNB. The first indication message may indicate that the first session and the second session are redundant sessions of each other, and may further indicate that the security key and the security policy of the first session are the same as those of the second session. The MgNB may further send the security key of the first session and the security policy of the first session to the SgNB.

For example, the MgNB may add the first indication message, the security key of the first session, or the security policy of the first session to a secondary gNB addition/modification request, and then send the secondary gNB addition/modification request to the SgNB.

After receiving the first indication message, the security key of the first session, or the security policy of the first session, the SgNB may determine the security policy and the security key of the second session based on the first indication message, and may directly perform configuration, or may configure the security policy and the security key of the second session after subsequently receiving a notification message from the MgNB. The notification message may indicate that the UE has completed configuration, or may indicate the SgNB to activate configuration of the second session.

For sending a secondary gNB addition/modification acknowledge message by the SgNB to the MgNB, sending the redundant transmission security information by the MgNB to the UE, and subsequent operations of the UE, the MgNB, and the SgNB, refer to related descriptions of the case in which the redundant transmission security information indicates that the security key and the security policy of the first session are the same as those of the second session in the embodiment shown in FIG. 5. Details are not repeated herein.

It should be understood that, a meaning of determining a security policy and a security key of a session is different from that of configuring a security policy and a security key of a session. The determining a security policy and a security key of a session means that a security policy and a security key of a session that subsequently needs to be configured may be determined based on some information (for example, the first indication message, and a security policy and a security key of another session), without performing an operation of configuring the security policy and the security key of the session. However, the configuring a security policy and a security key of a session means activating configuration of the second session to perform an operation of configuring the second session, for example, activating an encryption and/or integrity protection operation indicated in the security policy, or deactivating encryption and/or integrity protection indicated in the security policy.

It should be noted that, after receiving the first indication message, the SgNB may alternatively not follow an indication of the first indication message, but determine, based on current load of the SgNB, a network deployment policy, a resource status of the SgNB, or the like, whether a security key and a security policy that are the same as those of the first session can be configured for the second session. If it is determined that the same security key and the same security policy can be configured, configuration may be performed in the foregoing manner. If it is determined that a security key and a security policy that are different from those of the first session are to be configured for the second session, when the security key of the second session is different from that of the first session, the SgNB may continue to generate, through derivation, the security key of the second session based on the security key of the first session. If the second parameter is further required for generating the security key of the second session, the SgNB may send, to the MgNB, a request message used to request the second parameter, obtain the second parameter from the MgNB, and generate the security key of the second session. The second parameter may be alternatively pre-sent by the MgNB to the SgNB. When the security policy of the second session is different from that of the first session, the SgNB may configure the security policy of the second session based on the security policy of the first session. After determining the security key and the security policy of the second session, the SgNB may further send a second indication message to the MgNB. The second indication message is used to indicate the security key and the security policy of the second session. The second indication message may be a secondary gNB addition/modification acknowledge message. For operations of the UE, the MgNB, and the SgNB after the MgNB sends the redundant transmission security information to the UE, refer to related descriptions of the case in which the redundant transmission security information indicates that the security key and the security policy of the first session are different from those of the second session in the embodiment shown in FIG. 5. Details are not repeated herein. Herein, in the descriptions, only two cases in which the SgNB determines to configure, for the second session, a security key and a security policy that are different from or the same as those of the first session are mentioned. A case in which the security keys are the same and the security policies are different, and a case in which the security keys are different and the security policies are the same are similar to the foregoing two manners. Details are not repeated herein.

(2) The security key and the security policy of the first session are different from those of the second session.

After determining that the security key and the security policy of the first session are different from those of the second session, the MgNB may send a third indication message to the SgNB. The third indication message may indicate that the first session and the second session are redundant sessions of each other, and may further indicate that the security key and the security policy of the first session are different from those of the second session. The MgNB may further send, to the SgNB, the security key of the first session, the security policy of the first session, the second parameter, or an intermediate key used to generate the security key of the second session, for example, $K_{SgNB}$ or $K_{AMF}$. The MgNB may further determine the security policy of the second session, and send the security policy of the second session to the SgNB.

For example, the MgNB may add, to a secondary gNB addition/establishment request, the third indication message, the security key of the first session, the security policy of the first session, the second parameter, the intermediate key used to generate the security key of the second session, or a key derived based on the intermediate key, and then send the secondary gNB modification/establishment request to the SgNB. The security policy of the second session may also be carried in the secondary gNB addition/establishment request.

When receiving the third indication message, the security key of the first session, the security policy of the first session, the second parameter, or the intermediate key used to generate the security key of the second session, the SgNB may determine the security key and the security policy of the second session based on the received third indication message. For the security key of the second session, the SgNB may continue to generate, through derivation, the security key of the second session based on the security key of the first session, or may generate the security key of the second session based on the second parameter, the intermediate key, or the key derived based on the intermediate key. When the security policy of the second session is different, the SgNB may configure the security policy of the second session based on the security policy of the first session. If the security policy of the second session is received, the security policy of the second session may be used as a session policy to be subsequently configured for the second session.

For sending a secondary gNB addition/modification acknowledge message by the SgNB to the MgNB, sending the redundant transmission security information by the MgNB to the UE, and subsequent operations of the UE, the MgNB, and the SgNB, refer to related descriptions of the case in which the redundant transmission security information indicates that the security key and the security policy of the first session are different from those of the second session in the embodiment shown in FIG. 5. Details are not repeated herein.

It should be noted that, after receiving the third indication message, the SgNB may alternatively not follow an indication of the third indication message, but determine, based on current load of the SgNB, a network deployment policy, a resource status of the SgNB, or the like, whether a security key and a security policy that are different from those of the first session can be configured for the second session. If it is determined that different security keys and different security policies can be configured, configuration may be performed in the foregoing manner. If it is determined that a security key and a security policy that are the same as those of the first session are to be configured for the second session, the SgNB configures, for the second session, a security key and a security policy that are the same as those of the first session. For sending a secondary gNB addition/modification acknowledge message by the SgNB to the MgNB, sending the redundant transmission security information by the MgNB to the UE, and subsequent operations of the UE, the MgNB, and the SgNB, refer to related descriptions of the case in which the redundant transmission security information indicates that the security key and the security policy of the first session are different from those of the second session in the embodiment shown in FIG. 5. Details are not repeated herein. Herein, in the descriptions, only two cases in which the SgNB determines to configure, for the second session, a security key and a security policy that are different from or the same as those of the first session are mentioned.

A case in which the security keys are the same and the security policies are different, and a case in which the security keys are different and the security policies are the same are similar to the foregoing two manners. Details are not repeated herein.

In the descriptions of the foregoing two cases, only two cases in which the MgNB determines to configure, for the second session, a security key and a security policy that are different from or the same as those of the first session are mentioned. A case in which the security keys are the same and the security policies are different, and a case in which the security keys are different and the security policies are the same are similar to the foregoing two manners. Separately refer to corresponding descriptions about that the security keys are the same or different and the security policies are the same or different. Details are not repeated herein.

Figure 8:
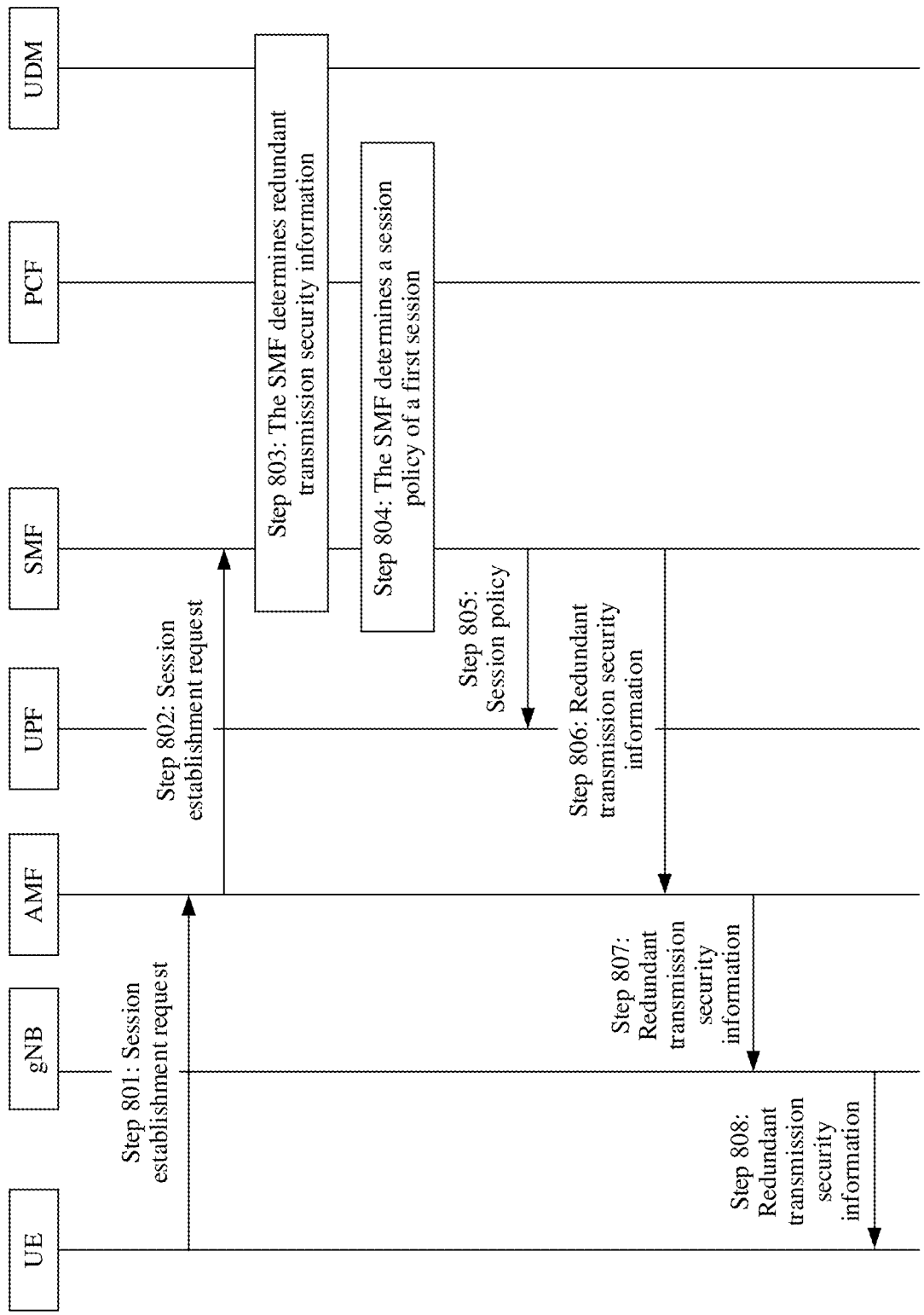
FIG. 8 is a schematic diagram of a network configuration method according to an embodiment of this application.

The following further describes the session configuration method provided in this application by using the embodiments shown in FIG. 5 and FIG. 7 in a specific scenario. FIG. 8 shows a session configuration method according to an embodiment of this application. The method includes the following steps.

Step 801: The UE sends a session establishment request to the AMF network element. The session establishment request is used to request to establish a first session.

The session establishment request may carry indication information indicating that the first session supports an URLLC service, or may not carry the indication information.

Step 802: After receiving the session establishment request, the AMF network element sends the session establishment request to the SMF network element.

Step 803: The SMF network element determines the redundant transmission security information.

For example, the SMF network element obtains, from the UDM network element, subscription information that is in subscription information of the UE and that is associated with the URLLC service, and determines the redundant transmission security information based on the subscription information that is in the subscription information of the UE and that is associated with the URLLC service. The redundant transmission security information indicates whether two sessions used for redundant transmission need to maintain a same security key and a same security policy.

In an example embodiment, an indication, such as an indication of a security policy for URLLC redundant transmission, may be set. If security policies are the same, the indication may be set to "1". The security policies are the same by default. If the indication is "2", the security policies are different. If the indication is "0", no selection is performed by default, and determining is specifically performed by a RAN-side node.

Step 804: The SMF network element determines a session policy of the first session by using the PCF network element.

If a data channel used for redundant transmission is at a QoS granularity, the SMF needs to determine the first QoS flow and the second QoS flow by using the PCF network element or the UDM network element, for example, needs to determine an identifier of the first QoS flow and an identifier of the second QoS flow. A QoS flow identifier may be obtained from a fifth-generation mobile communications quality of service identifier (5G QoS identity, 5QI), or may be a QoS flow identifier (QFI).

Step 805: The SMF network element sends the session policy of the first session to the UPF network element.

Step 806: The SMF network element sends the redundant transmission security information to the AMF network element.

In an example embodiment, the redundant transmission security information may further carry an identifier of the first session and an identifier of the second session.

If the data channel used for redundant transmission is at the QoS granularity, the redundant transmission security information may further carry the identifier of the first QoS flow and the identifier of the second QoS flow.

Step 807: The AMF network element sends the redundant transmission security information to the gNB.

Step 808: After receiving the redundant transmission security information, the gNB sends the redundant transmission security information to the UE.

After receiving the redundant transmission security information, the gNB may further configure the security keys and the security policies for the first session and the second session based on the redundant transmission security information. Correspondingly, after receiving the redundant transmission security information, the UE configures the security keys and the security policies for the first session and the second session based on the redundant transmission security information.

For manners of configuring the security keys and the security policies by the gNB and the UE for the first session and the second session when content indicated by the redundant transmission security information varies, refer to the embodiments shown in FIG. 5 and FIG. 6. Details are not repeated herein.

Figure 9:
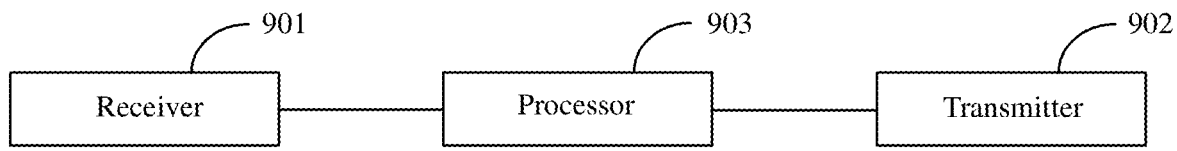
FIG. 9 to FIG. 15 are schematic structural diagrams of a communications apparatus according to embodiments of this application.

Based on an invention concept same as that of the method embodiments, an embodiment of this application further provides a communications apparatus, configured to perform the methods performed by the gNB in the embodiments shown in FIG. 5 and FIG. 8. For related features, refer to the foregoing method embodiments. Details are not repeated herein. As shown in FIG. 9, the apparatus includes a receiver 901 and a transmitter 902.

The receiver 901 is configured to receive redundant transmission security information of a first session from a session management network element. The redundant transmission security information is used to indicate security keys and security policies of the first session and a second session that need to be established by a terminal device. The second session is a redundant session of the first session.

The transmitter 902 is configured to send the redundant transmission security information to the terminal device.

In an example embodiment, the apparatus further includes a processor 903. After the receiver 901 receives the redundant transmission security information of the first session from the session management network element, the processor 903 may further configure the security keys and the security policies for the first session and the second session based on the redundant transmission security information.

In an example embodiment, the transmitter 902 may send the security policies of the first session and the second session to the terminal device.

In an example embodiment, the transmitter 902 may send a first parameter and a second parameter to the terminal device. The first parameter is a parameter used to generate a security key of the first session. The second parameter is a parameter used to generate a security key of the second session.

In an example embodiment, the redundant transmission security information indicates that the security key and a security policy of the first session are the same as those of the second session, or indicates that the security key and a security policy of the first session are different from those of the second session.

Figure 10:
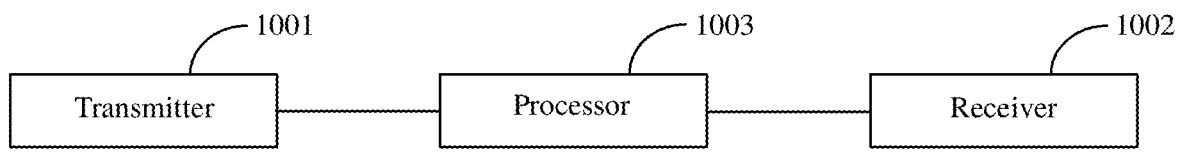

Based on an invention concept same as that of the method embodiments, an embodiment of this application further provides a communications apparatus, configured to perform the methods performed by the terminal device in the embodiments shown in FIG. 5 and FIG. 8. For related features, refer to the foregoing method embodiments. Details are not repeated herein. As shown in FIG. 10, the apparatus includes a transmitter 1001 and a receiver 1002.

The transmitter 1001 is configured to send a session establishment request to a session management network element. The session establishment request is used to request to establish the first session.

The receiver 1002 is configured to receive the redundant transmission security information from an access network device. The redundant transmission security information is used to indicate security keys and security policies of the first session and a second session. The second session is a redundant session of the first session.

In an example embodiment, the apparatus further includes a processor 1003. The processor 1003 may configure the security keys and the security policies for the first session and the second session based on the redundant transmission security information.

In an example embodiment, the receiver 1002 may further receive the security policies of the first session and the second session from the access network device. Then, when configuring the security policies for the first session and the second session based on the redundant transmission security information, the processor 1003 may configure the security policies for the first session and the second session based on the redundant transmission security information and based on the security policies of the first session and the second session.

In an example embodiment, the receiver 1002 may further receive a first parameter and a second parameter from the access network device. The first parameter is a parameter used to generate a security key of the first session. The second parameter is a parameter used to generate a security key of the second session. Then, when configuring the security keys for the first session and the second session based on the redundant transmission security information, the processor 1003 may configure the security keys for the first session and the second session based on the redundant transmission security information and based on the first parameter and the second parameter.

In an example embodiment, the redundant transmission security information indicates that the security key and a security policy of the first session are the same as those of the second session, or indicates that the security key and a security policy of the first session are different from those of the second session.

Figure 11:
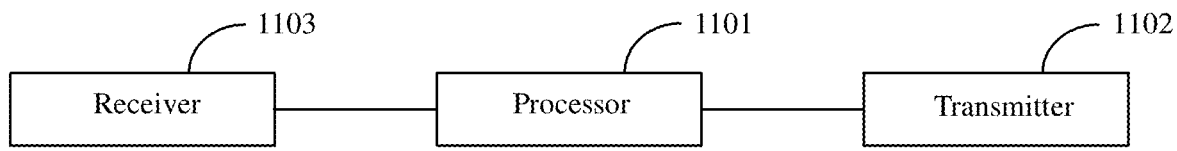

Based on an invention concept same as that of the method embodiments, an embodiment of this application further provides a communications apparatus, configured to perform the methods performed by the gNB in the embodiments shown in FIG. 7 and FIG. 8. For related features, refer to the foregoing method embodiments. Details are not repeated herein. As shown in FIG. 11, the apparatus includes a processor 1101 and a transmitter 1102.

The processor 1101 is configured to configure security keys and security policies for a first session and a second session that need to be established by a terminal device. The second session is a redundant session of the first session.

The transmitter 1102 is configured to send an indication message to the terminal device. The indication message is used to indicate the security keys and the security policies of the first session and the second session.

In an example embodiment, the apparatus further includes a receiver 1103. Before the processor 1101 configures the security keys and the security policies for the first session and the second session that need to be established by the terminal device, the receiver 1103 may receive redundant transmission security information of the first session from a session management network element. The redundant transmission security information indicates that the security keys and the security policies of the first session and the second session are determined by the access network device.

In an example embodiment, when configuring the security keys and the security policies for the first session and the second session that need to be established by the terminal device, the processor 1101 may determine, according to a first rule, the security keys and the security policies configured for the first session and the second session. The first rule includes some or all of the following:

load of the access network device, a network deployment policy, and a resource status of the access network device.

In an example embodiment, the transmitter 1102 may further send the security policies of the first session and the second session to the terminal device.

In an example embodiment, the transmitter 1102 may further send a first parameter and a second parameter to the terminal device. The first parameter is a parameter used to generate a security key of the first session. The second parameter is a parameter used to generate a security key of the second session.

In an example embodiment, the processor 1101 configures a same security key and a same security policy for the first session and the second session, and the indication message is used to indicate that the security key and a security policy of the first session are the same as those of the second session.

In an example embodiment, the processor 1101 configures different security keys and different security policies for the first session and the second session, and the indication message is used to indicate that the security key and a security policy of the first session are different from those of the second session.

Figure 12:
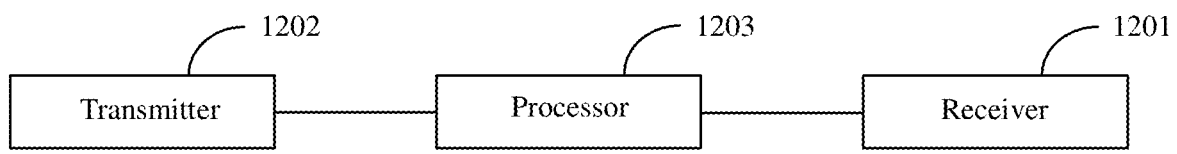

Based on an invention concept same as that of the method embodiments, an embodiment of this application further provides a communications apparatus, configured to perform the methods performed by the terminal device in the embodiments shown in FIG. 7 and FIG. 8. For related features, refer to the foregoing method embodiments. Details are not repeated herein. As shown in FIG. 12, the apparatus includes a receiver 1201 and a transmitter 1202.

The transmitter 1202 is configured to send a session establishment request to a session management network element. The session establishment request is used to request to establish the first session.

The receiver 1201 is configured to receive an indication message from an access network device. The indication message is used to indicate security keys and security policies of the first session and a second session. The second session is a redundant session of the first session.

In an example embodiment, the apparatus further includes a processor 1203. The processor 1203 may configure the security keys and the security policies for the first session and the second session based on the indication message.

In an example embodiment, the receiver 1201 may first receive the security policies of the first session and the second session from the access network device. Then, when configuring the security policies for the first session and the second session based on the indication message, the processor 1203 may configure the security keys and the security policies for the first session and the second session based on the indication message and based on the security policies of the first session and the second session.

In an example embodiment, the receiver 1201 may first receive a first parameter and a second parameter from the access network device. The first parameter is a parameter used to generate a security key of the first session. The second parameter is a parameter used to generate a security key of the second session. Then, when configuring the security keys for the first session and the second session based on the indication message, the processor 1203 may configure the security keys for the first session and the second session based on the indication message and based on the first parameter and the second parameter.

In an example embodiment, the indication message indicates that the security key and a security policy of the first session are the same as those of the second session, or indicates that the security key and a security policy of the first session are different from those of the second session.

Figure 13:
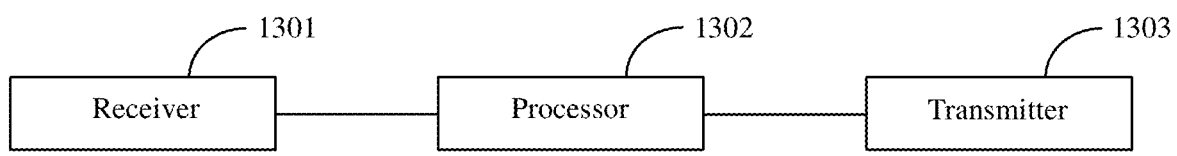

Based on an invention concept same as that of the method embodiments, an embodiment of this application further provides a communications apparatus, configured to perform the methods performed by the SMF network element in the embodiments shown in FIG. 5, FIG. 6, FIG. 7, and FIG. 8. For related features, refer to the foregoing method embodiments. Details are not repeated herein. As shown in FIG. 13, the apparatus includes a receiver 1301, a processor 1302, and a transmitter 1303.

The receiver 1301 is configured to receive a session establishment request from a terminal device. The session establishment request is used to request to establish the first session.

After the receiver 1301 receives the session establishment request from the terminal device, the processor 1302 is configured to determine redundant transmission security information of the first session. The redundant transmission security information is used to indicate security keys and security policies of the first session and a second session. The second session is a redundant session of the first session.

The transmitter 1303 is configured to send the redundant transmission security information to an access network device.

In an example embodiment, when determining the redundant transmission security information of the first session, the processor 1302 may determine the redundant transmission security information based on first information. The first information is some or all of the following: subscription information of the terminal device, a session policy locally stored on the session management network element, and a session policy obtained by the session management network element from a policy control network element.

In an example embodiment, the processor 1302 may alternatively receive the redundant transmission security information from another network element, for example, the policy control network element.

In an example embodiment, when sending the redundant transmission security information of the first session to the access network device, the transmitter 1303 may send the redundant transmission security information to the access network device by using an access management network element.

In an example embodiment, the redundant transmission security information indicates that a security key and a security policy of the first session are the same as those of the second session, or indicates that a security key and a security policy of the first session are different from those of the second session, or indicates that the security keys and the security policies of the first session and the second session are determined by the access network device.

The unit division in the embodiments of this application is an example, and is merely logical function division, and there may be other division manners in actual implementation. In addition, functional units in the embodiments of this application may be integrated in one processor, or each of the units may exist alone physically, or at least two units may be integrated in one module. The foregoing integrated unit may be implemented in a form of hardware, or may be implemented in a form of a software functional module.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a terminal device (which may be a personal computer, a mobile phone, a network device, or the like) or a processor to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

In the embodiments of this application, both the access network device and the terminal device may be presented by dividing the functional modules through integration. Herein, the "module" may be a specific ASIC, a circuit, a processor that executes one or more software or firmware programs, a memory, an integrated logic circuit, and/or another device that can provide the foregoing functions.

Figure 14:
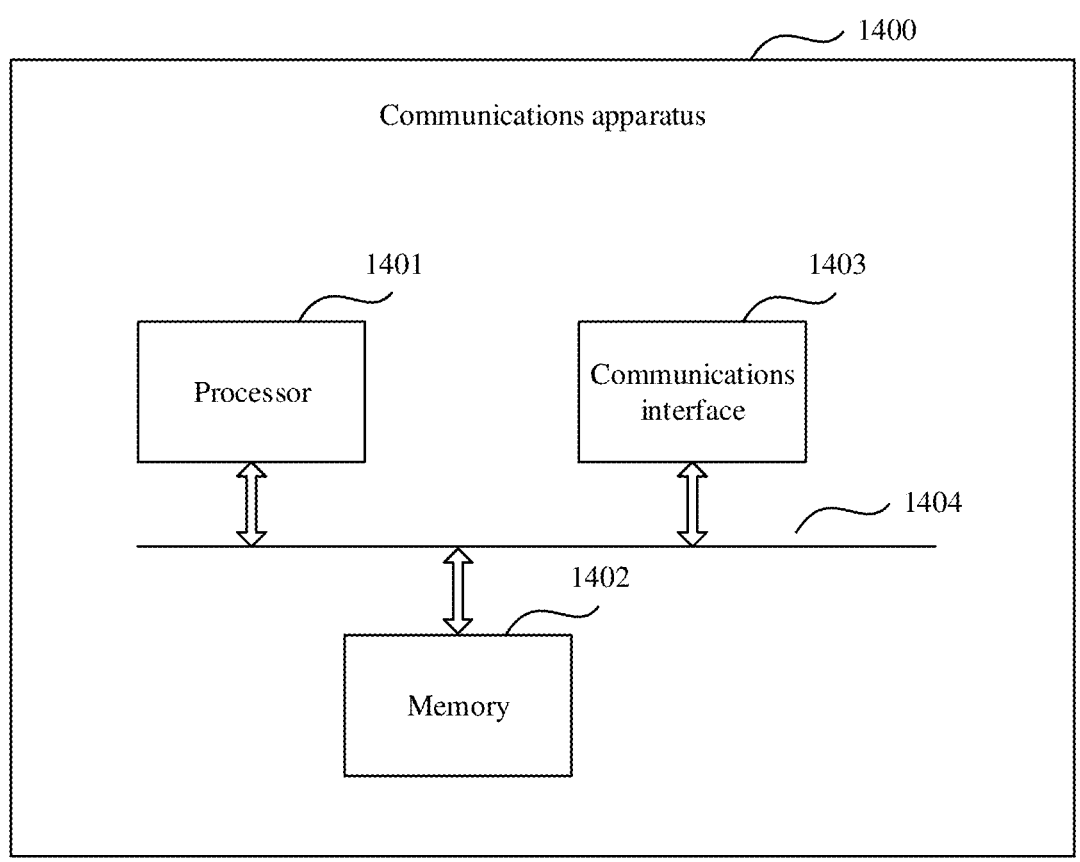

In a simple embodiment, a person of ordinary skill in the art may figure out that the access network device and the session management network element may be in a form shown in FIG. 14.

An apparatus 1400 shown in FIG. 14 includes at least one processor 1401 and a memory 1402, and optionally, may further include a communications interface 1403.

The memory 1402 may be a volatile memory, for example, a random access memory; or the memory may be a non-volatile memory, for example, a read-only memory, a flash memory, a hard disk drive (HDD), or a solid-state drive (SSD); or the memory 1402 is any other medium that can be used to carry or store expected program code in a form of one or more instructions or a data structure and that can be accessed by a computer, but is not limited thereto. The memory 1402 may be a combination of the foregoing memories.

In this embodiment of this application, a specific connection medium between the processor 1401 and the memory 1402 is not limited. In this embodiment of this application, in the figure, the memory 1402 and the processor 1401 are connected by using a bus 1404. The bus 1404 is represented by a bold line in the figure. A connection manner between other components is described merely as an example and does not constitute a limitation. The bus 1404 may be classified into an address bus, a data bus, a control bus, and the like. For ease of representation, only one thick line is used to represent the bus in FIG. 14, but this does not mean that there is only one bus or only one type of bus.

The processor 1401 may have a data transceiver function, and can communicate with another device. In the apparatus in FIG. 14, an independent data transceiver module, for example, the communications interface 1403, may be alternatively disposed, to send and receive data. When communicating with another device, the processor 1401 may perform data transmission by using the communications interface 1403.

When the access network device is in the form shown in FIG. 14, the processor 1401 in FIG. 14 may invoke computer-executable instructions stored in the memory 1402, so that the access network device can perform the method performed by the gNB in any one of the foregoing method embodiments.

For example, functions and implementation processes of the receiver, the transmitter, and the processor in FIG. 9 and FIG. 11 may be implemented by the processor 1401 in FIG. 14 by invoking the computer-executable instructions stored in the memory 1402. Alternatively, a function and an implementation process of the processor in FIG. 9 and FIG. 11 may be implemented by the processor 1401 in FIG. 14 by invoking the computer-executable instructions stored in the memory 1402; and a function and an implementation process of the receiver and the transmitter in FIG. 9 and FIG. 11 may be implemented by the communications interface 1403 in FIG. 14.

When the session management network element is in the form shown in FIG. 14, the processor 1401 in FIG. 14 may invoke computer-executable instructions stored in the memory 1402, so that the session management network element can perform the method performed by the SMF network element in any one of the foregoing method embodiments.

For example, functions and implementation processes of the receiver, the transmitter, and the processor in FIG. 13 may be implemented by the processor 1401 in FIG. 14 by invoking the computer-executable instructions stored in the memory 1402. Alternatively, a function and an implementation process of the processor in FIG. 13 may be implemented by the processor 1401 in FIG. 14 by invoking the computer-executable instructions stored in the memory 1402; and a function and an implementation process of the receiver and the transmitter in FIG. 13 may be implemented by the communications interface 1403 in FIG. 14.

The apparatus provided in this embodiment of this application may perform the foregoing communication method. Therefore, for a technical effect that can be achieved by the apparatus, refer to the foregoing method embodiments. Details are not repeated herein.

Figure 15:
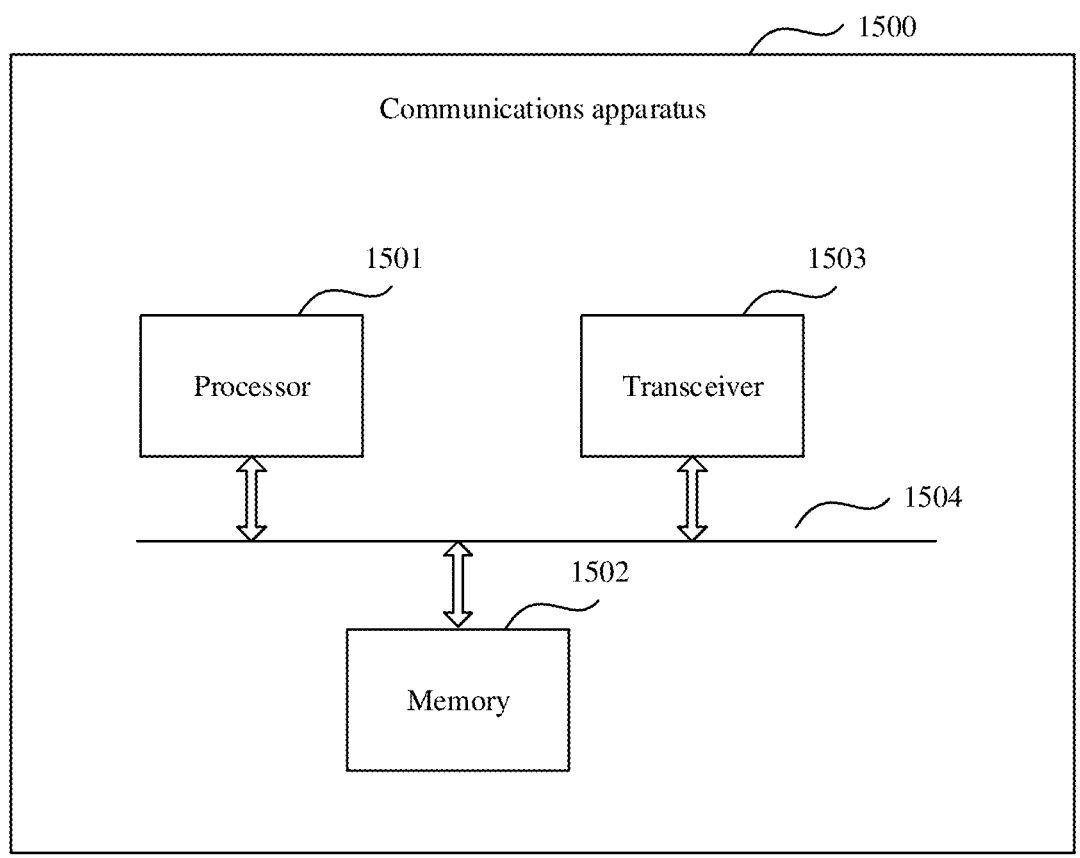

In a simple embodiment, a person of ordinary skill in the art may figure out that the terminal device may be in a form shown in FIG. 15.

An apparatus 1500 shown in FIG. 15 includes at least one processor 1501 and a memory 1502, and optionally, may further include a transceiver 1503.

The memory 1502 may be a volatile memory, for example, a random access memory; or the memory may be a non-volatile memory, for example, a read-only memory, a flash memory, a hard disk drive (HDD), or a solid-state drive (SSD); or the memory 1502 is any other medium that can be used to carry or store expected program code in a form of one or more instructions or a data structure and that can be accessed by a computer, but is not limited thereto. The memory 1502 may be a combination of the foregoing memories.

In this embodiment of this application, a specific connection medium between the processor 1501 and the memory 1502 is not limited. In this embodiment of this application, in the figure, the memory 1502 and the processor 1501 are connected by using a bus 1504. The bus 1504 is represented by a bold line in the figure. A connection manner between other components is described merely as an example and does not constitute a limitation. The bus 1504 may be classified into an address bus, a data bus, a control bus, and the like. For ease of representation, only one thick line is used to represent the bus in FIG. 15, but this does not mean that there is only one bus or only one type of bus.

The processor 1501 may have a data transceiver function, and can communicate with another device. In the apparatus in FIG. 15, an independent data transceiver module, for example, the transceiver 1503, may be alternatively disposed, to send and receive data. When communicating with another device, the processor 1501 may perform data transmission by using the transceiver 1503.

When the terminal device is in the form shown in FIG. 15, the processor 1501 in FIG. 15 may invoke computer-executable instructions stored in the memory 1502, so that the terminal device can perform the method performed by the UE in any one of the foregoing method embodiments.

For example, functions and implementation processes of the receiver, the transmitter, and the processor in FIG. 10 and FIG. 12 may be implemented by the processor 1501 in FIG. 15 by invoking the computer-executable instructions stored in the memory 1502. Alternatively, a function and an implementation process of the processor in FIG. 10 and FIG. 12 may be implemented by the processor 1501 in FIG. 15 by invoking the computer-executable instructions stored in the memory 1502; and a function and an implementation process of the receiver and the transmitter in FIG. 10 and FIG. 12 may be implemented by the transceiver 1503 in FIG. 15.

The apparatus provided in this embodiment of this application may perform the foregoing communication methods. Therefore, for a technical effect that can be achieved by the apparatus, refer to the foregoing method embodiments. Details are not repeated herein.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person of ordinary skill in the art can make various modifications and variations to embodiment in the present disclosure without departing from the spirit and scope of the present disclosure. This application is intended to cover these modifications and variations provided that they fall within the scope of protection defined by the following claims and their equivalent technologies.

What is claimed is:

1. A session configuration method, comprising:
receiving, by an access network device, redundant transmission security information of a first session from a session management network element, wherein the redundant transmission security information is indicative of security keys and security policies of the first session and a second session that need to be established by a terminal device, and the first session and the second session are redundant sessions for redundant transmission of copies of the same data; and
sending, by the access network device, the redundant transmission security information to the terminal device,
wherein the method further comprises:
after receiving the redundant transmission security information, configuring, by the access network device, the security keys and the security policies for the first session and the second session based on the redundant transmission security information.

2. The method according to claim 1, further comprising:
after receiving the redundant transmission security information,
sending, by the access network device, the security policies of the first session and the second session to the terminal device.

3. The method according to claim 1, further comprising:
after receiving the redundant transmission security information,
sending, by the access network device, a first parameter and a second parameter to the terminal device, wherein the first parameter is a parameter used to generate a security key of the first session, and the second parameter is a parameter used to generate a security key of the second session.

4. The method according to claim 1, wherein the redundant transmission security information indicates that a security key and a security policy of the first session are the same as those of the second session.

5. The method according to claim 1, wherein the first session and the second session correspond to two different data channels.

6. The method according to claim 5, wherein each of the two different data channels is at a session granularity, a bearer granularity, or a quality of service flow (QoS flow) granularity.

7. The method according to claim 1, wherein the redundant transmission security information indicates that a security key and a security policy of the first session are different from those of the second session.

8. The method according to claim 7, wherein the security keys of the first session and the second session are generated based on an intermediate key or a key derived from the intermediate key.

9. A session configuration method, comprising:
sending, by a terminal device, a session establishment request to a session management network element, wherein the session establishment request requests to establish a first session; and
receiving, by the terminal device, redundant transmission security information of the first session from an access network device, wherein the redundant transmission security information is indicative of security keys and security policies of the first session and a second session, and the first session and the second session are redundant sessions for redundant transmission of copies of the same data,
wherein the method further comprises:
configuring, by the terminal device, the security keys and the security policies for the first session and the second session based on the redundant transmission security information.

10. The method according to claim 9, wherein the configuring, by the terminal device, the security policies for the first session and the second session based on the redundant transmission security information comprises:
receiving, by the terminal device, the security policies of the first session and the second session from the access network device; and
configuring, by the terminal device, the security policies for the first session and the second session based on the redundant transmission security information and based on the received security policies of the first session and the second session.

11. The method according to claim 9, wherein the configuring, by the terminal device, the security keys for the first session and the second session based on the redundant transmission security information comprises:
receiving, by the terminal device, a first parameter and a second parameter from the access network device, wherein the first parameter is a parameter used to generate a security key of the first session, and the second parameter is a parameter used to generate a security key of the second session; and
configuring, by the terminal device, the security keys for the first session and the second session based on the redundant transmission security information and based on the received first parameter and the second parameter.

12. The method according to claim 9, wherein the redundant transmission security information indicates that a security key and a security policy of the first session are the same as those of the second session, or indicates that a security key and a security policy of the first session are different from those of the second session.

13. A communications apparatus, comprising a receiver and a transmitter, wherein
the receiver is configured to receive redundant transmission security information of a first session from a session management network element, wherein the redundant transmission security information is indicative of security keys and security policies of the first session and a second session that need to be established by a terminal device, and the first session and the second session are redundant sessions for redundant transmission of copies of the same data; and
the transmitter is configured to send the redundant transmission security information to the terminal device,
wherein the apparatus further comprises a processor configured to, after the receiver receives the redundant transmission security information of the first session from the session management network element, configure the security keys and the security policies for the first session and the second session based on the redundant transmission security information.

14. The apparatus according to claim 13, wherein the transmitter is further configured to:
send the security policies of the first session and the second session to the terminal device.

15. The apparatus according to claim 13, wherein the transmitter is further configured to:
send a first parameter and a second parameter to the terminal device, wherein the first parameter is a parameter used to generate a security key of the first session, and the second parameter is a parameter used to generate a security key of the second session.

16. The apparatus according to claim 13, wherein the redundant transmission security information indicates that a security key and a security policy of the first session are the same as those of the second session, or indicates that a security key and a security policy of the first session are different from those of the second session.

* * * * *